United States Patent
Asauchi et al.

(10) Patent No.: US 7,343,298 B2
(45) Date of Patent: Mar. 11, 2008

(54) METHOD AND SYSTEM FOR SUPPLY OF EXPENDABLES

(75) Inventors: Noboru Asauchi, Nagano-ken (JP); Koichi Otsuki, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 1116 days.

(21) Appl. No.: 09/982,749

(22) Filed: Oct. 22, 2001

(65) Prior Publication Data

US 2002/0091585 A1    Jul. 11, 2002

(30) Foreign Application Priority Data

Oct. 20, 2000   (JP)   ............... 2000-321325
Jan. 10, 2001   (JP)   ............... 2001-002032

(51) Int. Cl.
  *G06Q 99/00*   (2006.01)
  *G06Q 30/00*   (2006.01)
  *G06F 17/30*   (2006.01)
  *G03G 15/00*   (2006.01)

(52) U.S. Cl. ............... 705/1; 399/12; 705/26; 705/27

(58) Field of Classification Search ............... 705/400, 705/1, 27, 26; 399/12; 347/85
See application file for complete search history.

(56) References Cited

U.S. PATENT DOCUMENTS

| | | | | |
|---|---|---|---|---|
| 4,811,234 A | * | 3/1989 | Storace | 705/403 |
| 4,961,507 A | * | 10/1990 | Higgins | 221/129 |
| 5,170,710 A | * | 12/1992 | Harpold et al. | 101/335 |
| 5,383,129 A | * | 1/1995 | Farrell | 705/400 |
| 5,657,678 A | * | 8/1997 | Cohen | 83/870 |
| 6,089,688 A | * | 7/2000 | Froger et al. | 347/7 |
| 6,798,997 B1 | * | 9/2004 | Hayward et al. | 399/12 |
| 6,985,877 B1 | * | 1/2006 | Hayward et al. | 705/27 |
| 7,013,092 B2 | * | 3/2006 | Hayward et al. | 399/24 |
| 7,106,460 B2 | * | 9/2006 | Haines et al. | 358/1.12 |
| 2002/0022990 A1 | * | 2/2002 | Kurata et al. | 705/14 |
| 2002/0042747 A1 | * | 4/2002 | Istvan | 705/26 |
| 2002/0055883 A1 | * | 5/2002 | Shiba et al. | 705/26 |
| 2002/0059106 A1 | * | 5/2002 | Tani | 705/26 |
| 2002/0077979 A1 | * | 6/2002 | Nagata | 705/40 |

FOREIGN PATENT DOCUMENTS

| | | | |
|---|---|---|---|
| EP | 0838768 | * | 4/1998 |
| JP | 02-84677 A | * | 3/1990 |
| JP | 2000-148432 A | | 5/2000 |
| WO | WO92/18335 A1 | * | 10/1992 |
| WO | WO97/23352 | | 7/1997 |

OTHER PUBLICATIONS

"AOL, HP Partner for printing Services" Online Reporter, Dec. 6, 1999.*

* cited by examiner

*Primary Examiner*—John W. Hayes
*Assistant Examiner*—Rutao Wu
(74) *Attorney, Agent, or Firm*—Sughrue Mion Pllc.

(57) ABSTRACT

In response to an order from a user, a new expendable container is supplied in exchange for an expendable container possessed by the user. Price for ink supply is determined based on expendable-related information that indicates at least the model of the expendable container possessed by the user, thereby promoting refilling and recycling of expendable containers. Price can be discounted if there is remaining ink, whereby discarding of ink can be discouraged, thus contributing to protection of the environment.

7 Claims, 20 Drawing Sheets

Fig.5

| | Information Description | |
|---|---|---|
| 501 | Ink Cartridge Model Data | ⎫ |
| 502 | Manufacturing Date Data | |
| 503 | Production Line Data | |
| 504 | Serial Number Data | |
| 505 | Cyan Ink Capacity Data | ⎬ 210 |
| 506 | Magenta Ink Capacity Data | |
| 507 | Yellow Ink Capacity Data | |
| 508 | Light Cyan Ink Capacity Data | |
| 509 | Light Magenta Ink Capacity Data | ⎭ |
| 510 | Unsealing Date Data | ⎫ |
| 511 | Remaining Cyan Ink Data | |
| 512 | Remaining Magenta Ink Data | |
| 513 | Remaining Yellow Ink Data | ⎬ 220 |
| 514 | Remaining Light Cyan Ink Data | |
| 515 | Remaining Light Magenta Ink Data | |
| 516 | Order Flag | ⎭ |

Fig. 6

| | Information Description | |
|---|---|---|
| 601 | Number of Fill-Ups, Refills, Substitutions | 310 |
| 602 | Number of Fill-Ups, Refills, Substitutions (Cyan Ink) | |
| 603 | Number of Fill-Ups, Refills, Substitutions (Magenta Ink) | |
| 604 | Number of Fill-Ups, Refills, Substitutions (Yellow Ink) | |
| 605 | Number of Fill-Ups, Refills, Substitutions (Light Cyan Ink) | |
| 606 | Number of Fill-Ups, Refills, Substitutions (Light Magenta Ink) | |
| 607 | Ink Type Data (Cyan Ink) | 320 |
| 608 | Ink Type Data (Magenta Ink) | |
| 609 | Ink Type Data (Yellow Ink) | |
| 610 | Ink Type Data (Light Cyan Ink) | |
| 611 | Ink Type Data (Light Magenta Ink) | |
| 612 | Expiration Date (Cyan Ink) | |
| 613 | Expiration Date (Magenta Ink) | |
| 614 | Expiration Date (Yellow Ink) | |
| 615 | Expiration Date (Light Cyan Ink) | |
| 616 | Expiration Date (Light Magenta Ink) | |
| 617 | Operating System Information | 330 |
| 618 | Printer ID | |
| 619 | Printer Driver Information | |
| 620 | Firmware Information | |

METHOD AND SYSTEM FOR SUPPLY OF EXPENDABLES

BACKGROUND OF THE INVENTION

1. Field of the Invention

This invention relates to a technique relating to determining prices at which expendables are supplied, assuming that the expendable containers are to be recycled.

2. Description of the Related Art

Recent years have seen widespread adoption of ink-jet printers and laser printers as computer output devices. Expendables such as inkjet printer ink and laser printer toner are typically provided in the form of ink cartridges and toner cartridges. There has also been rising concern regarding efficient use of resources through reuse and recycling, and manufacturers of ink cartridges and the like are promoting refilling.

On the user side, however, the incentive to recycle expendable containers is not always significant, which creates a problem in terms of recovering expendable containers. Given the current state of affairs, expendable container reuse cannot be said to reach full potential.

SUMMARY OF THE INVENTION

Accordingly, an object of the present invention is to provide incentives for reusing expendable containers such as ink and toner cartridges, so as to promote more efficient use of resources.

In order to attain the above and the other objects of the present invention, there is provided a method for determining a price at which a new expendable is to be supplied. In the method, the price is determined by a computer in response to a user inquiry. The method comprises the steps of: receiving the inquiry including expendable-related information by the computer, the expendable-related information being indicative of a model of an expendable container possessed by the user; and determining the price by the computer based on the expendable-related information.

According to the invention, the price at which a new expendable to be supplied is determined with reference to expendable-related information indicating the model of the expendable container possessed by the user, thus providing an incentive for users to recycle expendable containers.

In a preferred embodiment of the invention, the expendable container possessed by the user comprises a memory for storing the expendable-related information, and the expendable-related information is read out from the memory. By providing expendable containers with memory containing expendable-related information, expendable-related information for determining price on the presumption of refilling or recycling can be reliably associated with the expendable container to be refilled or recycled. This effectively avoids the problem of an expendable being supplied at a price set by expendable-related information for a different expendable container, for example.

In a preferred embodiment of the invention, the step (b) includes the steps of: verifying whether a first type order has been submitted to the supplier for the expendable container before, the first type order being for providing a new expendable contained in a new expendable container on condition that the expendable container possessed by the user is returned to the supplier; and determining a first type price for the first type order if the first type order has not been submitted before, while determining a second type price if the first type order has been submitted, the second price being determined for a second type order, the second type order being for providing a new expendable contained in a new expendable container on condition that the expendable container possessed by the user is NOT returned to the supplier.

With this arrangement, when new expendables are ordered—by means of an electronic transaction over the Internet, for example—at pre-discounted price, it is possible to prevent duplicate discounts from being made in error.

In a preferred embodiment of the invention, the step (b) further includes a step of providing the user with options of the first type price and the second type price if the first type order has not been submitted before. This arrangement can smoothly deal with instances where, for example, a user desires to increase purchases of new expendables while still having adequate stock of expendables on hand.

In a preferred embodiment of the invention, the new expendable differs from the expendable remaining in the expendable container possessed by the user; the inquiry includes new expendable information indicative of a type of the new expendable selected by the user; and the step (b) further includes a step of determining an price based on the new expendable information and the expendable-related information. This arrangement allows price to be determined even in the event that a newly developed expendable is marketed for an existing printer, providing an incentive to reuse or recycle when purchasing such expendables.

In another embodiment, there is provided a method for supplying a new expendable packaged in a new expendable container by a computer. The method comprises the steps of: (a) accepting an inquiry regarding supply of the new expendable, the inquiry including expendable-related information indicative of a model of an expendable container possessed by a user; (b) determining a first type price at which the new expendable is to be supplied on condition that the expendable container possessed by the user is returned in response to the inquiry; (c) displaying the first type price to the user; (d) accepting a first type order from the user, the first type order generating a charge amount at the first type price on condition that the expendable container possessed by the user is returned; and (e) supplying the new expendable in exchange for the expendable container possessed by the user in response to the first type order.

According to the supply method herein, a discount for return of the expendable container possessed by a user is made from the offered price for a new expendable, and the discount provides an incentive to return the container, encouraging recycling of expendable containers possessed by the user.

In a preferred embodiment of the invention, the expendable-related information preferably further includes information indicative of a remaining amount of expendable remaining in the expendable container. With this arrangement, discounts can be made on the basis of residual amounts of expendables, thus encouraging refilling of expendable containers containing large residual amounts of expendables. This reduces environmental pollution caused by residual expendables.

In a preferred embodiment of the invention, the step (c) further preferably includes a step of displaying an expendable supply menu for supplying expendable if the remaining amount falls below a predetermined value. This arrangement encourages purchases of new expendable by means of the method herein, thus promoting recycling of expendable containers.

In a preferred embodiment of the invention, in preferred practice the expendable-related information further includes unsealing date information indicative of a unsealing date of the expendable; the step (c) further includes the steps of: electing at least one new expendable from a plurality of types of expendables of different volume based on the remaining amount information; and displaying the selected new expendable as a recommended expendable.

With this arrangement, if a user should use an expendable on an infrequent basis, purchase of a smaller size can be encouraged, thus reducing environmental pollution resulting from discarding residual expendables. For users that frequently consume an expendable, on the other hand, purchase of a larger size can be encouraged, thus reducing environmental pollution by discarded expendable containers.

The invention may be embodied in a number of ways, for example, as an ink supply system and ink supply control device; as a computer program for performing the method or functions of the device; as a storage medium for storing such a computer program; as data signals containing this computer program and transmitted on a carrier wave; and so on.

These and other objects, features, aspects, and advantages of the present invention will become more apparent from the following detailed description of the preferred embodiments with the accompanying drawings.

BRIEF DESCRIPTION OF THE DRAWINGS

FIG. 5 is an illustrative diagram of exemplary data stored in memory 180F.

FIG. 6 is an illustrative diagram of exemplary data stored in memory 180F.

DESCRIPTION OF THE PREFERRED EMBODIMENT

Figure 1:
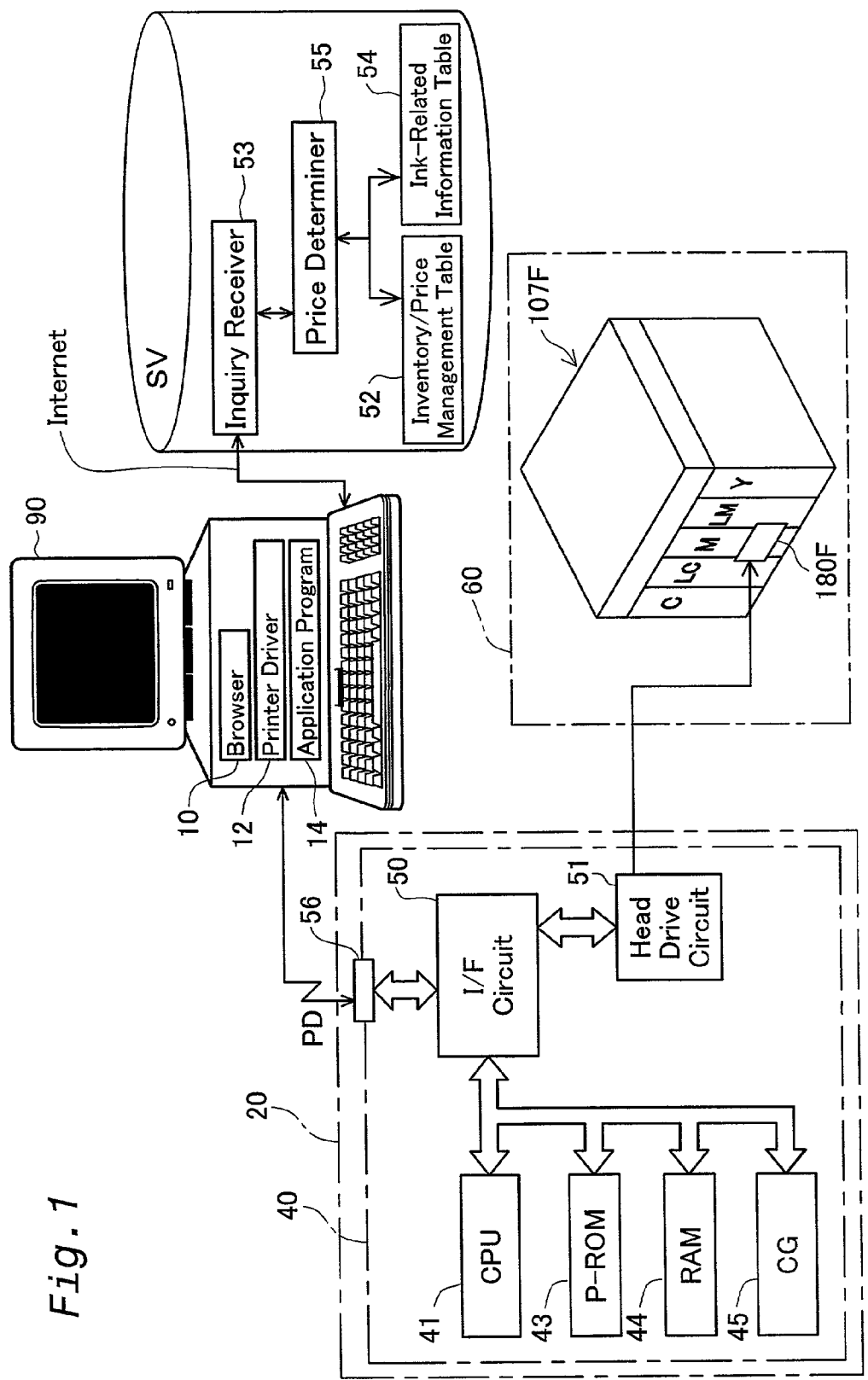
FIG. 1 is an illustrative diagram of an exemplary electrical arrangement for an expendable supply system embodying an expendable supply method according to a first embodiment of the invention.

The present invention is explained in the following sequence based on embodiments.
A. First embodiment
B. Second embodiment
C. Third embodiment
D. Modifications A. First Embodiment FIG. 1 is an illustrative diagram of an exemplary electrical arrangement for an expendable supply system embodying an expendable supply method according to a first embodiment of the invention. In this first example, ink is selected as an exemplary expendable. This ink supply system comprises a server SV for managing ink supply; a computer 90; and a printer 20. Server SV and computer 90 are networked via the Internet, and computer 90 and printer 20 are connected via a parallel cable. The combination of computer 90 and printer 20 can herein be referred to as "printing device 21".

On computer 90 is installed any of a number of programs that run on a specific operating system. In the example depicted in FIG. 1, computer 90 has been installed thereon typical programs, namely, a browser 10 for viewing Web pages; a printer driver 12 that has the function of driving printer 20; and an application program 14 for generating text and image data to be printed by printer 20. To print, the Print command is selected from application program 14, and the file to be printed is transferred to printer driver 12. Rendering and other processes are performed on the file to generate print data to be sent to printer 20. Printer 20 receives this print data via the parallel cable, and performs printing. Printer 20 comprises firmware 22 (not shown) for controlling operation thereof.

The control circuit 40 of printer 20 is an arithmetic and logic unit comprising a CPU 41, a rewritable programmable ROM (P-ROM) 43, RAM 44, and a character generator (CG) 45 that stores character dot matrices. This control circuit 40 additionally comprises a interface circuit 50 dedicated to interface with an external motor, etc.; and a head driver circuit 51 connected to interface circuit 50, for driving a print head unit 60 to eject ink. Interface circuit 50 includes a parallel interface circuit allowing print data PD supplied by computer 90 to be received via a connector 56. Printer 20 performs printing in accordance with this print data PD. RAM 44 functions as a buffer memory for temporary storage of raster data; printer firmware 22 is stored in PROM 43. Rewritable non-volatile memory of various kinds can be used as P-ROM 43; EEPROM can be used, for example.

Via head driver circuit 51 and interface circuit 50, control circuit 40 can also transmit to computer 90 data read from a memory 180F of an ink cartridge 107F installed in print head unit 60. Ink cartridge 107F corresponds to the "expendable container possessed by the user" herein.

Computer 90 transmits data read from memory 180F to server system SV via the Internet. Server system SV manages and supports ink supply through orders placed over the Internet. Specifically, it performs the following management and support functions. An inquiry receiver 53 accepts a price inquiry from a user, accompanied by expendable-related information read from memory 180F. In response to this inquiry, a price determiner 55 determines price based on the data in an inventory/price management table 52. The determined price is displayed on the display of computer 90 using the browser 10. Server system SV also provides information necessary for the supplied ink, and other user support services.

Figure 2:
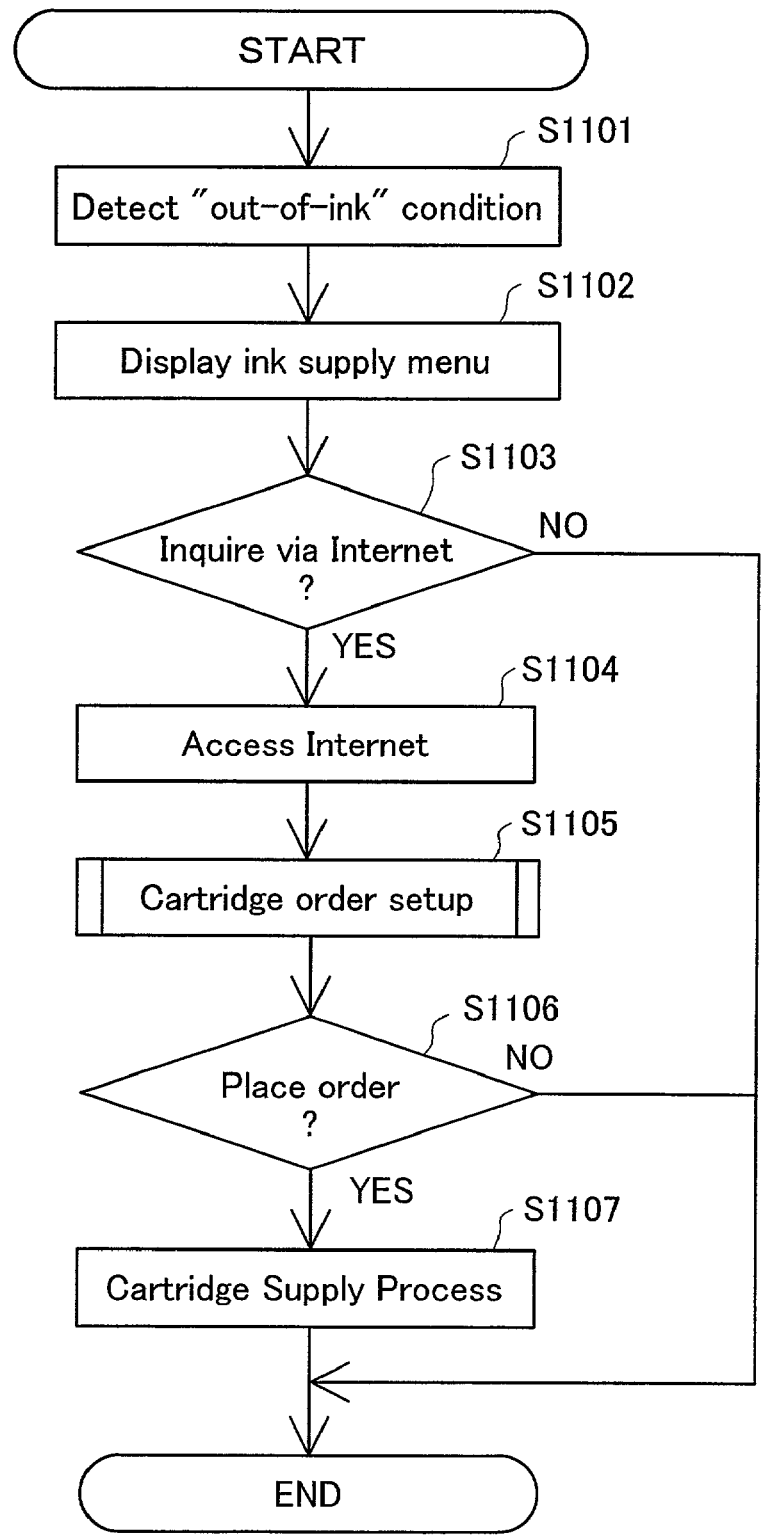
FIG. 2 is a flow chart depicting the steps in an ink supply process according to a first embodiment of the invention.

FIG. 2 is a flow chart depicting the steps in an ink supply process according to a first embodiment of the invention. In Step S1101, CPU 41 detects an out-of-ink condition. The ink supply process may be initiated when an out-of-ink condition is detected, but is not limited thereto; it may be initiated when the expiration date of the ink has passed, or initiated under user control. An out-of-ink condition refers herein to one in which the amount of ink consumed for any of the ink tanks 117F (not shown) in ink cartridge 107F exceeds a remaining ink amount stored in memory, for example. The amount of ink consumption is measured by printer 20.

A low-ink condition may be used instead of an out-of-ink condition. A low-ink condition refers herein to one in which the difference between a remaining ink amount stored in memory and the amount of ink consumed for any of the ink tanks 117F (not shown) in ink cartridge 107F falls below a predetermined threshold value.

This threshold value may vary over time. For example, ink consumption typically increases at the end of the year as New Year's cards are printed; thus, the threshold value may be set higher to provide earlier warning of low ink level.

Figure 3:
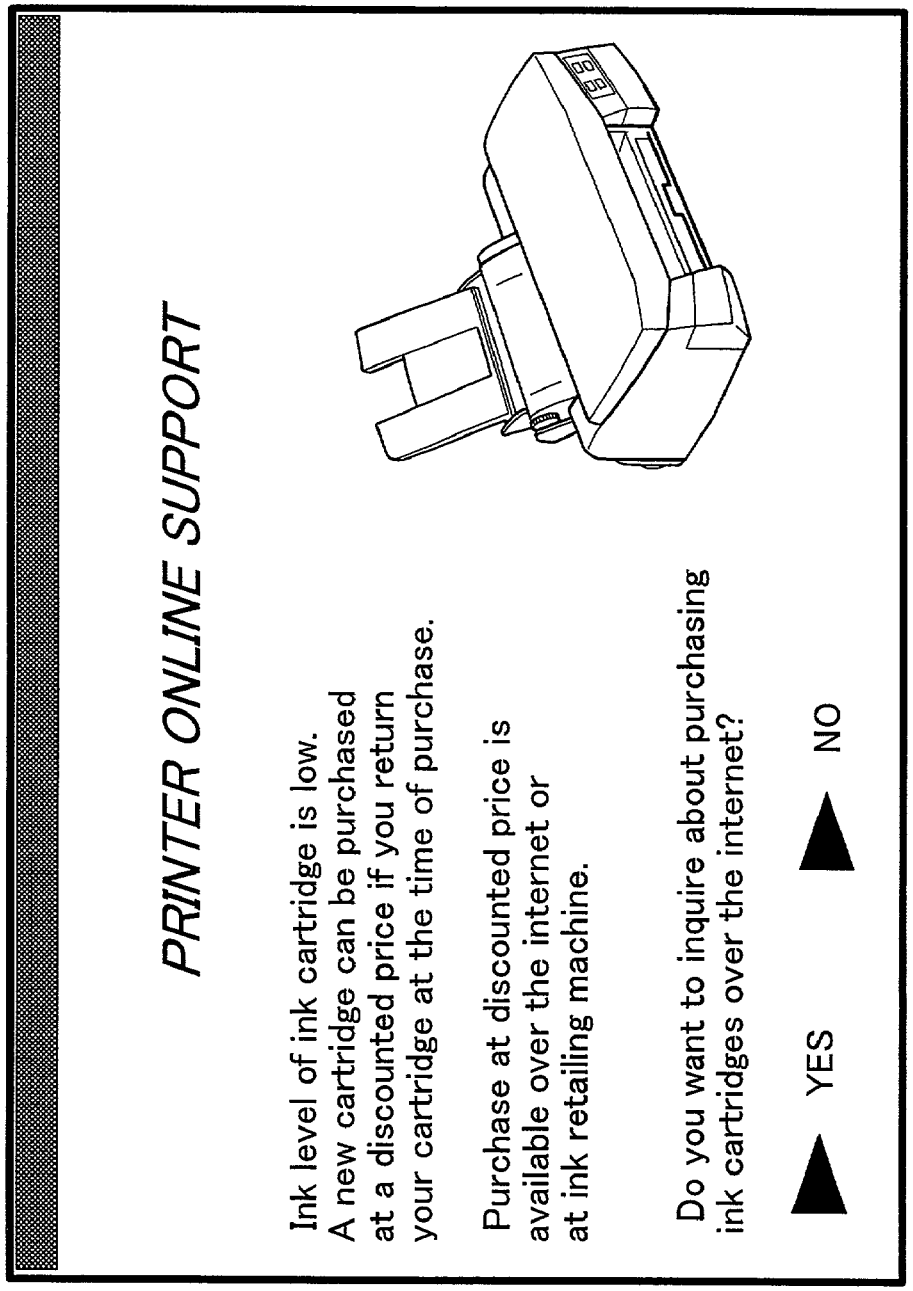
FIG. 3 is an ink supply menu displayed on the display of computer 90.

In Step S1102, computer 90 displays an ink supply menu (FIG. 3). This ink supply menu inquires whether the user wishes to order a new ink cartridge 107F over the Internet. Where the display indicates a low-ink condition, the display will preferably indicate approximately how much printing is possible with the remaining inks.

In Step S1103, the user decides whether to inquire about supply of a new ink cartridge over the Internet. If, as a result of this decision, the user clicks "No" on the ink supply menu, the ink supply menu disappears. An icon may be created on the menu of computer 90 to allow an inquiry to be made at a later date. If the user clicks "Yes" on the ink supply menu, the system proceeds to Step S1104.

In Step S1104, computer 90 accesses server system SV via the Internet. In preferred practice, access will be performed automatically by computer 90 using a URL (Uniform Resource Locator) stored in printer 20 or in memory 180F of ink cartridge 107F. Once access is established, the system proceeds to Step S1105 (cartridge order setup process).

Figure 4:
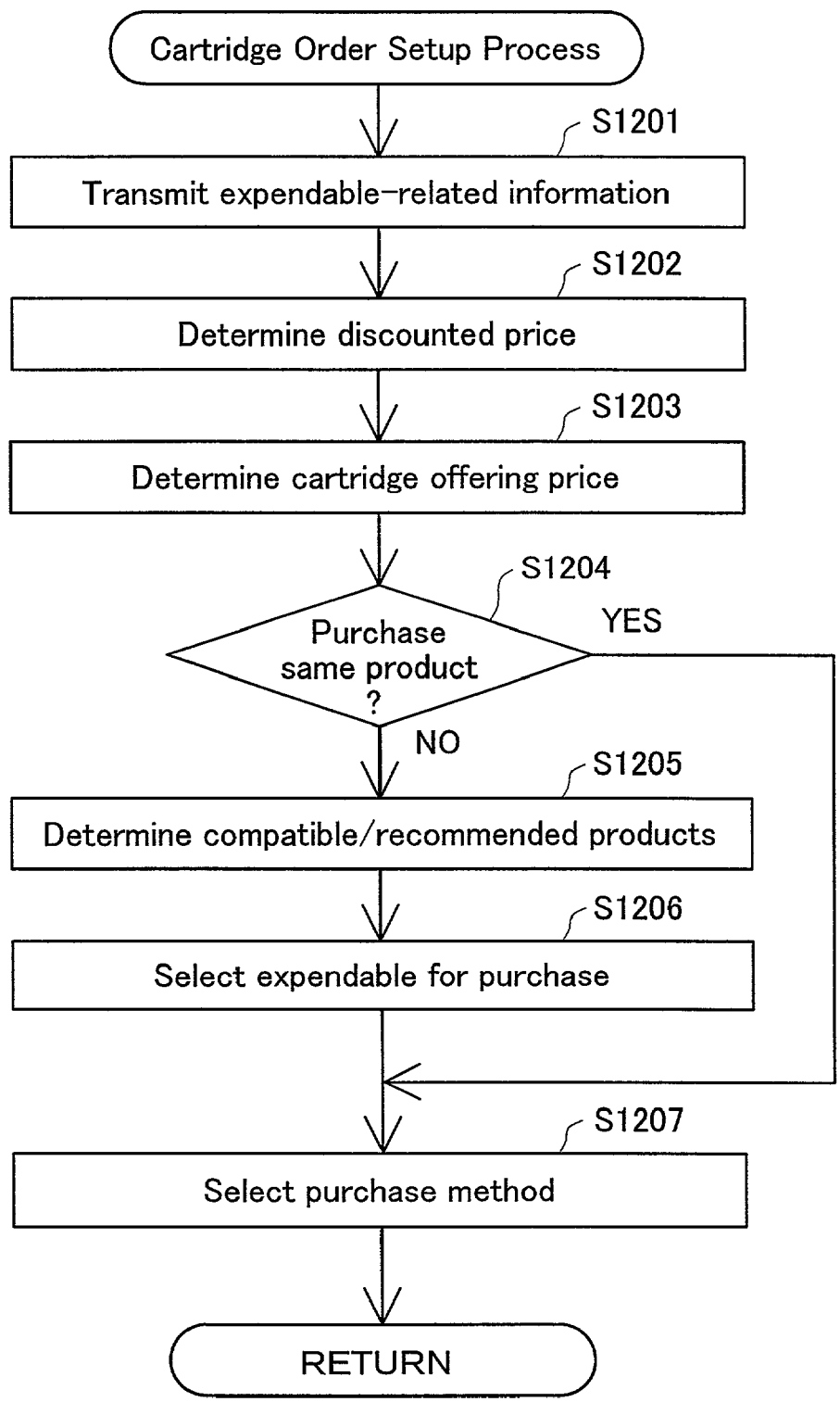
FIG. 4 is a flow chart depicting the steps in placing a cartridge order according to a first embodiment of the invention.

FIG. 4 is a flow chart depicting the steps in placing a cartridge order according to a first embodiment of the invention. In Step S1201, the computer 90 sends information read from memory 180F to the server system SV. The server system SV receives the information at the inquiry receiver 53. This information includes information indicating the model of the ink cartridge installed in the print head unit 60, information about the amount of remaining ink in each ink tank 117F, and the ink expiration date.

FIGS. 5 and 6 are illustrative diagrams of exemplary data stored in memory 180F. Memory 180F has areas for storing five categories of data. The first category is data 210 which relates to manufacturing of ink cartridge 107F; the second category is data 220 which relates to ink cartridge service; the third category is data 310 which relates to the number of ink fill-ups/refills/substitutions; the fourth category is ink-related data 320; and the fifth category is service environment information 330 for the ink cartridge of printing device 21.

Data 210 relating to manufacturing of ink cartridge 107F includes the following data: model data of ink cartridge 107F; manufacturing date data; production line data; serial number data; and data indicating the capacity of each ink tank 117F (not shown) in ink cartridge 107F. This data is used to determine which ink cartridge(s) can be supplied.

Data 220 relating to ink cartridge service includes data indicating the remaining amount of each ink in the cartridge; cartridge unsealing date data; and an order flag. In the present embodiment, data indicating the remaining amount of each ink in the cartridge is used to compute the discount on the ink cartridge offering price. Cartridge unsealing date data is used to estimate ink deterioration and the frequency of ink use by the user, and records the date of installation in the printer 20. The order flag records order status information indicating whether a cartridge has been ordered previously on condition that the current ink cartridge will be returned, for example. If such an order has been submitted previously, the price determiner 55 computes a price that does not assume return of the ink cartridge.

Data 310 relating to the number of ink fill-ups/refills/substitutions (FIG. 6) includes information used when the user replenishes ink using the ink supply device. This data will be described in detail later.

Ink-related data 320 includes information about the types of ink contained in each ink tank 117F, and the ink expiration date for these. In the present embodiment, this data is used to calculate the discount on the ink cartridge offering price.

In the present example, service environment information 330 for the ink cartridge of printing device 21 includes a printer ID indicating the model of the printer 20 in which ink cartridge 107F was last used; information about the operating system of the computer 90 connected to printer 20; printer driver information indicating printer driver 12 (FIG. 1) type and version; and firmware information indicating firmware 22 type and version. This information is used to determine whether an ink cartridge containing ink of a different type than the ink in ink cartridge 107F can be used.

"Ink cartridge service environment information" herein is information used when substituting a different ink type, to determine whether substituted ink can be used normally in a printer using the cartridge in question. Ink cartridge service environment information typically includes at least some of the following information: information indicating the kind of software (printer driver) used to generate print data from image data; and information indicating the kind of hardware (i.e. the printer) and software (i.e. firmware in the printer) used to perform printing of the generated print data.

In Step S1202, price determiner 55 determines a discount based on return of the ink cartridge. In the first instance, discounting is performed on the basis of the container, namely, the cartridge. For example, let it be assumed that ink cartridge 107F has a price of 1000 yen, of which 500 yen is the cost of container, i.e. the cartridge. Where the percent discount is 60%, the discount is 300 yen.

Computing price discounts on the basis of the container, namely, the cartridge, in this way provides an incentive for the use to recycle expendable containers. This promotes recycling and reuse of expendable containers.

In preferred practice, computation of the discounts additionally takes into account the amount of ink remaining in the ink cartridge. Since discarded residual ink represents a pollution problem, the more the amount of ink remaining in an ink cartridge is, the more the need of recycle will be.

Discounts on the basis of remaining ink are performed by the price determiner 55 using the following method, for example. First, a determination is made as to whether the expiration date of the ink remaining in ink tanks 117F has passed. As a result of this determination, price determiner 55 makes the following decisions for each ink tank 117F, depending on whether the expiration date has passed.

(1) If the expiration date has not passed, the discount is equal to 50% of the product of the amount of remaining ink in the ink tank and the price of the remaining ink.

(2) If the expiration date has passed, the discount is equal to 100% of the product of the amount of remaining ink in the ink tank and the price of the remaining ink.

It is sufficient for the discount to be computed on the basis of the amount of remaining ink in ink tank 117F: the decision may be made irrespective of expiration date. Discount rates are not limited to 50% and 100%, and may be selected arbitrarily. In this example, the reason for using different discount rates depending on whether the expiration date has passed is to provide an incentive for the user to consume as much ink as possible before the expiration date.

A specific calculation would be performed as follows. Let it be assumed, for example, that the ink remaining in an ink tank 117F has not expired, the ink price is 100 yen per 1 cc, and the remaining amount is 1.5 cc. The discount will be 100 yen×1.5 cc×0.5=75 yen. Under these same conditions, but where the remaining ink is expired, the discount will be 150 yen.

In Step S1203, price determiner 55 determines an ink cartridge offering price based on the discount calculated previously, and the cost of the new ink cartridge. To give a specific example, let it be assumed, for example, that the usual price of ink cartridge 107F is 1000 yen, that the discount for the container (i.e. cartridge) is 300 yen, and that the discount for ink in ink tank 117F is 150 yen. If ink cartridge 107F is not returned, the price of the new cartridge will be 1000 yen, whereas if it is returned the price of the new cartridge will be 500 yen. This result is displayed by inquiry receiver 53 on the ink cartridge supply inquiry menu (FIG. 7).

Figure 7:
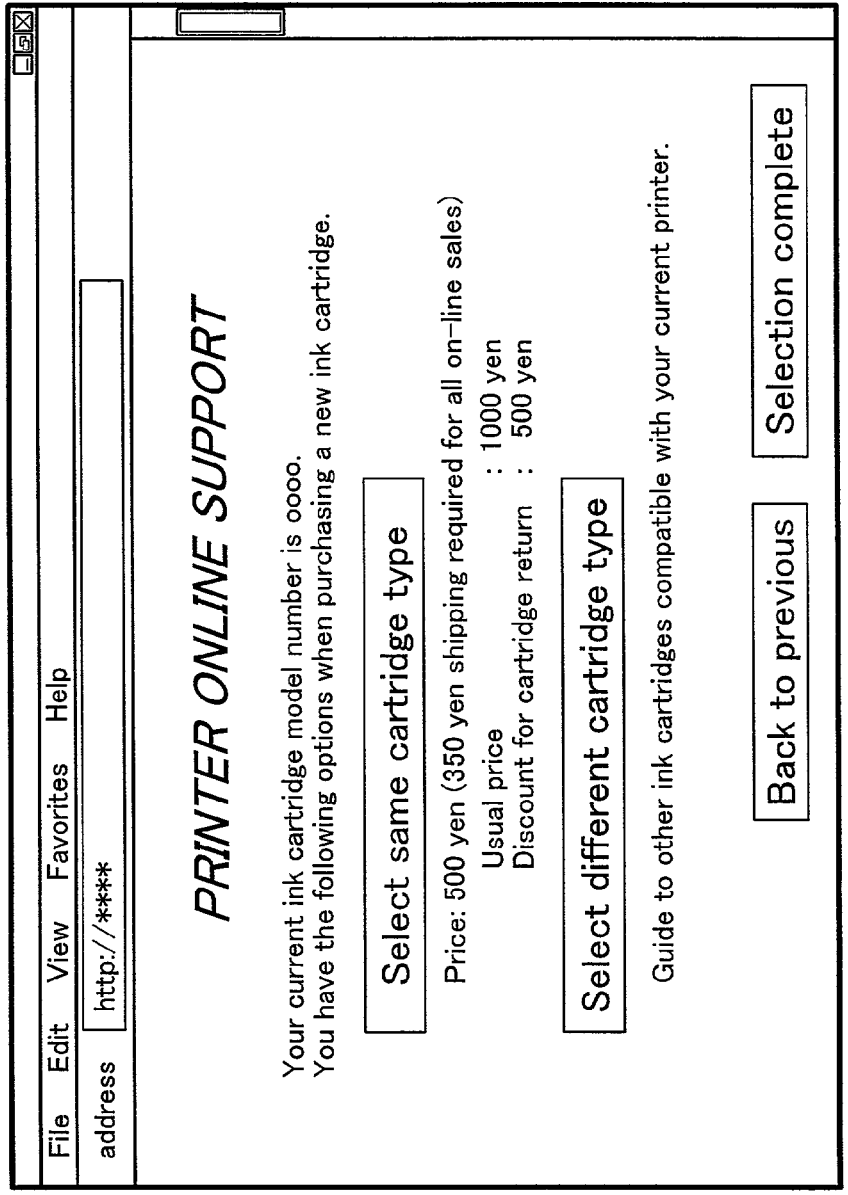
FIG. 7 is an exemplary inquiry menu for ink cartridge supply.

FIG. 7 is an exemplary inquiry menu for ink cartridge supply. This inquiry menu is displayed by inquiry receiver 53 on computer 90 via the Internet. On the inquiry menu, clicking "Select Same Cartridge Type" sets up an order for the same type of cartridge. The cartridge ordering process then proceeds to Step S1207. On the other hand, if "Select Different Cartridge Type" is clicked the cartridge ordering process proceeds to Step S1205.

In Step S1205 inquiry receiver 53 determines which ink cartridges are compatible and which ink cartridges are recommended. Compatible ink cartridges refers herein to other ink cartridges that can be used in the printing device 21 currently using the ink cartridge possessed by the user. In this example, recommended ink cartridges refers to ink cartridges best suited to the user in light of their ink capacity.

Compatible ink cartridge determination is made by inquiry receiver 53 on the basis of the ink cartridge service environment in the printing device 21 in which ink cartridge 107F was last used. This decision is made in the first instance on the basis of the printer 20 model, with ink cartridges compatible with this model being selected from among the available ink cartridges. Next, a decision is made, for example, on the basis of information indicating the type and version of the software that generates data for controlling ink ejection (such as the printer driver 12 or firmware 22). The inclusion of information pertaining to software type and version in the decision process is due to the hypothetical possibility that, for example, a new ink may not provide a correctly matched color combination unless a new version of printer driver 12 is used, resulting in an inability to print optimally.

As a result, inquiry receiver 53 designates as compatible cartridges those cartridges that can be used without modifying the ink cartridge service environment in printing device 21. Inquiry receiver 53 also designates cartridges that cannot be used without a software update, etc. as "conditionally compatible" cartridges, and indicates conditions under which these may be used.

By presenting to the user a list of compatible cartridges, users can be informed when, for example, a new compatible product has become available. This expands the range of ink cartridge selection available to users.

Recommended cartridges are designated from among compatible cartridges, for example, through selection on the basis of ink cartridge unsealing date and amount of remaining ink information. Specifically, where a user's ink cartridge contains a significant amount of remaining ink that is past the expiration date, an ink cartridge having smaller ink capacity can be designated as the recommended cartridge. From remaining amount of ink information it can be determined that a user uses large amounts of a particular color, and if a cartridge having a higher ink capacity for this particular color is available, this cartridge can be recommended as suitable for this user.

By presenting the user with recommended cartridges, a user who consumes an expendable less frequently can be prompted to purchase a smaller size, thereby reducing environmental pollution due to discarding of residual expendables. On the other hand, a user who consumes an expendable more frequently can be prompted to purchase a larger size, thereby reducing environmental pollution due to discarding of expendable containers. A user who disproportionately uses a particular color of ink can be offers a cartridge of suitable capacity.

Figure 8:
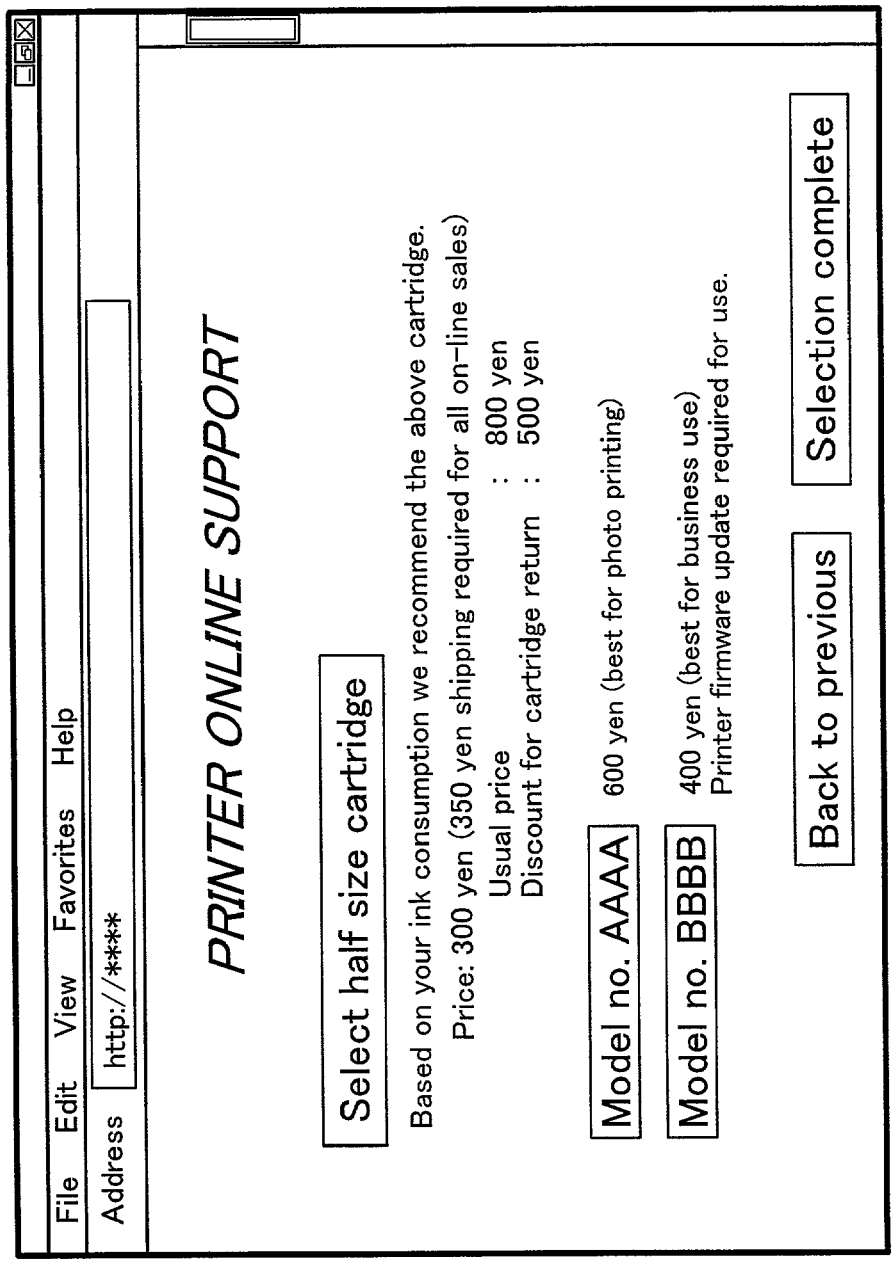
FIG. 8 is an inquiry menu showing other ink cartridges compatible with the printer used by the user.

FIG. 8 is an inquiry menu showing other ink cartridges compatible with the printer used by the user. This inquiry menu is also displayed by inquiry receiver 53 on computer 90 via the Internet. On this inquiry menu, a half-size cartridge is shown as a recommended cartridge. A half-size cartridge refers to one having half the ink capacity of an ordinary cartridge. Also shown are a compatible cartridge "Model AAAA" and a conditionally compatible cartridge "Model BBBB". A condition for use of "Model BBBB" is noted as well. If the user clicks "Select Half-size Cartridge" or "Model AAAA" from this inquiry menu, the process proceeds to Step S1206.

In Step S1206, inquiry receiver 53 sets up an order selecting the clicked cartridge. Where the conditionally compatible cartridge "Model BBBB" is clicked, an order selecting the cartridge is placed and an update menu (not shown) for the printer firmware is displayed. From this update menu, the printer firmware 22 can be updated automatically via the Internet.

Figure 9:
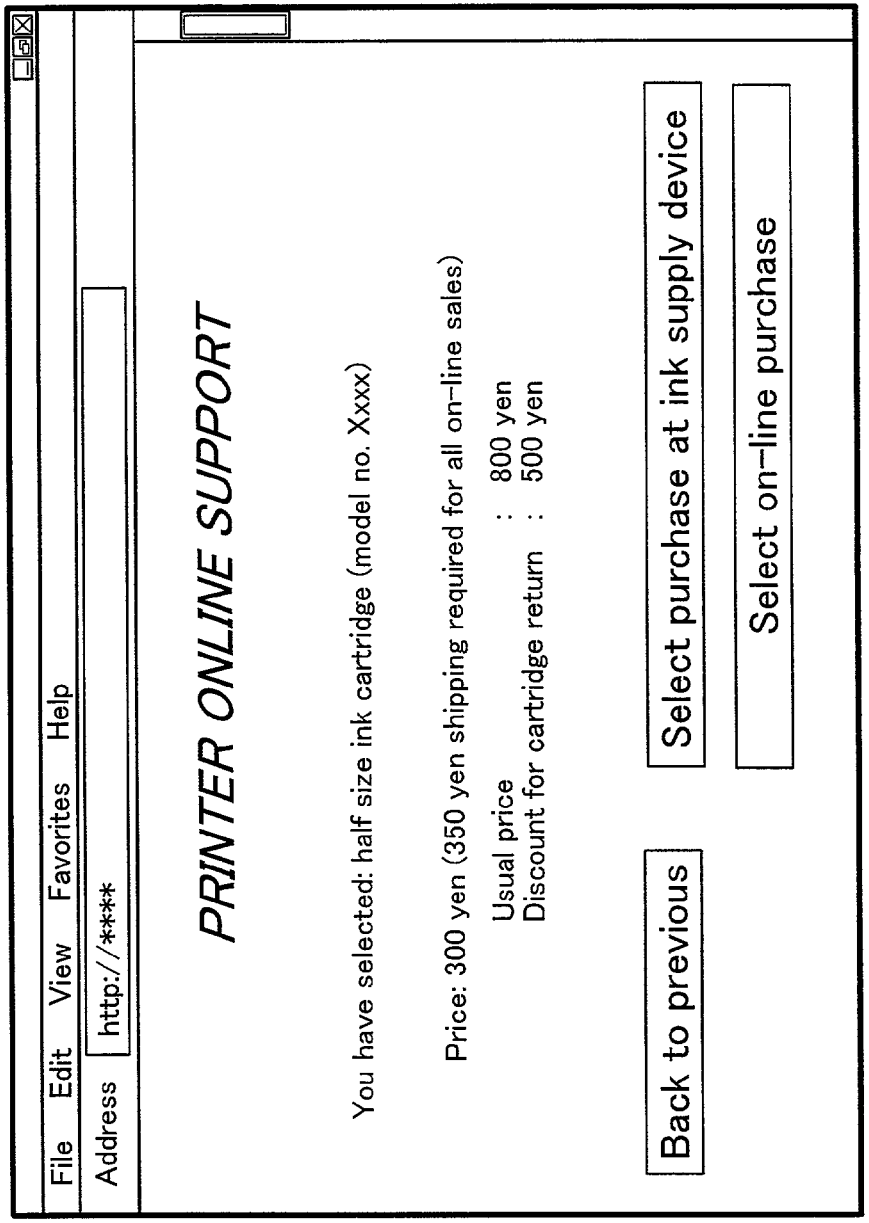
FIG. 9 is an inquiry menu for selecting ink cartridge purchase method.

Once the user has finished selecting a cartridge in this manner, an inquiry menu for selecting purchase method, depicted in FIG. 9, is displayed. This inquiry menu allows the user to select a cartridge purchase method. The inquiry menu also enables verification of selected cartridge and price.

In Step S1207, the user selects a cartridge purchase method. In this example, the purchase method can be selected from purchase from an ink supply device, and purchase on-line. For on-line purchases, the purchase method may involve exchanging the cartridge possessed by the user using COD courier delivery. For purchases from an ink supply device, the purchase method is from an ink supply device, described later. Once the purchase method has been selected and the process of setting up the order is completed, the system returns to Step S1106 (FIG. 2).

In Step S1106, the user verifies the contents of the cartridge order, and submits the order. Where on-line purchase has been selected, the ordering process takes place by transmitting the name and address, for example. Where purchase from an ink supply device has been selected, the contents of the cartridge order are stored in memory 180F provided to the cartridge. The method of using this stored data and the method of purchasing from an ink supply device are described later.

When order processing is complete, the order flag of the memory 180F of ink cartridge 107F is changed to "order completed". This order flag corresponds to order status information. This prevents ink cartridge 107F from being used to obtain duplicate discounts, or ink from being obtained in error from ink supply device 30 after an order has been placed on-line.

In Step S1107, a new ink cartridge supply process is performed. This is accomplished, in the case of courier delivery as described above, for example, by retrieving the ink cartridge 107F that at the time of ordering was scheduled to be returned, along with the money. The case of ink supply will be described later. The expendable container recycler need not necessarily by the new cartridge vendor; any recycling facility will suffice.

By means of the procedure illustrated in FIGS. 2 and 4, users may receive economic benefit by returning ink cartridges, thereby providing an incentive to return ink cartridges so as to promote reuse of ink cartridges. This is advantageous for environmental reasons, and also provides a greater level of satisfaction to users.

B. Second Embodiment

Figure 10:
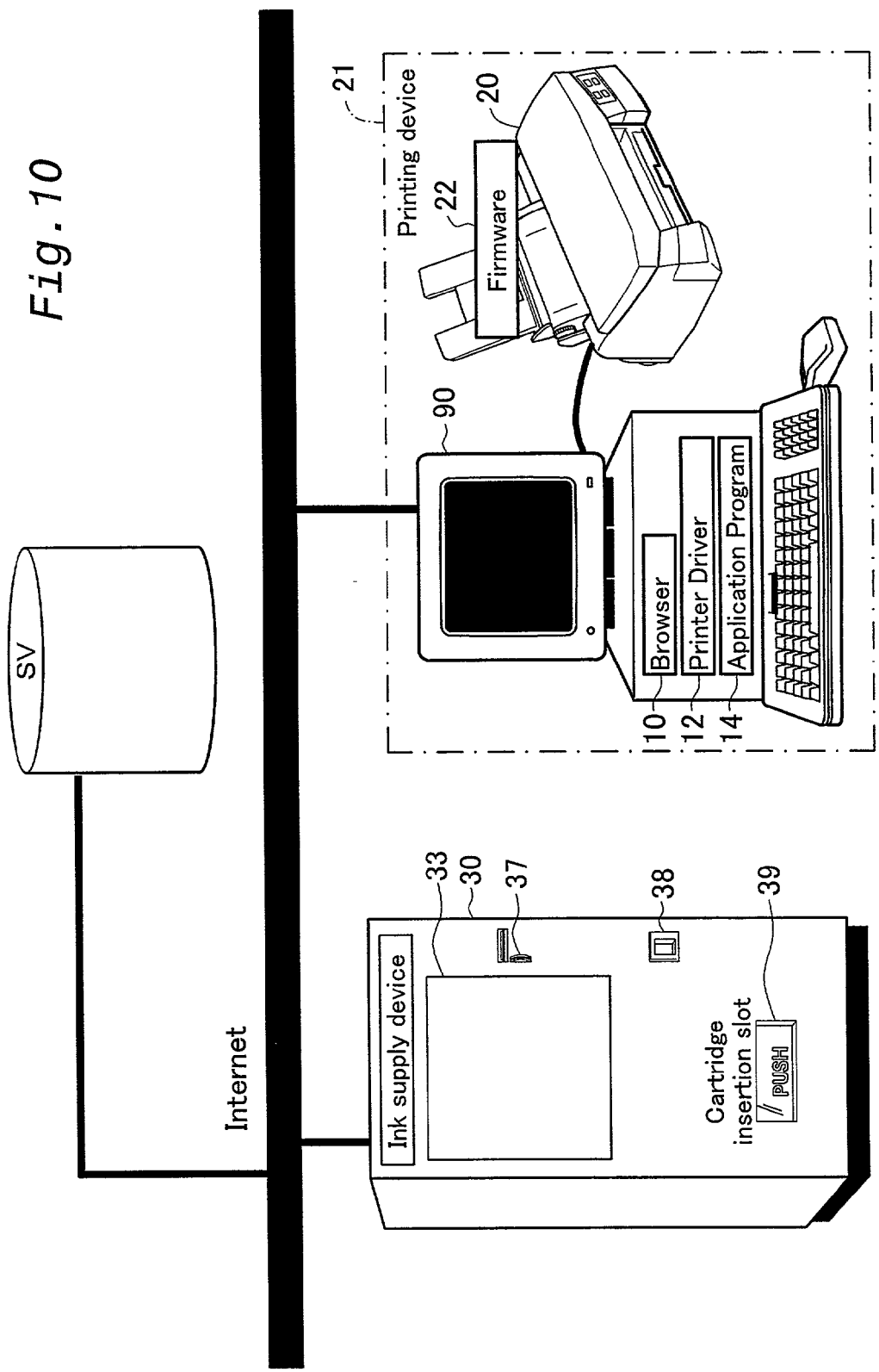
FIG. 10 is an illustrative diagram of an exemplary arrangement for a new expendable supply system according to a second embodiment of the invention.

FIG. 10 is an illustrative diagram of an exemplary arrangement for a new expendable supply system according to a second embodiment of the invention. In this example, as in the first embodiment, the expendable is an ink cartridge. This ink supply system comprises a server system SV for managing ink supply, an ink supply device 30, and a printing device 21 that uses the supplied ink.

Printing device 21 has a computer 90 and printer 20 connected to computer 90 via a parallel cable. Printer 20 and computer 90 may be connected over a LAN (Local Area Network). As in the first embodiment, computer 90 has installed thereon a browser 10, printer driver 12, and application program 14.

Ink supply device 30 comprises an Input unit 32 (described later), a display 33, a payment portion 37, a change return portion 38, and a cartridge insertion slot 39.

Figure 11:
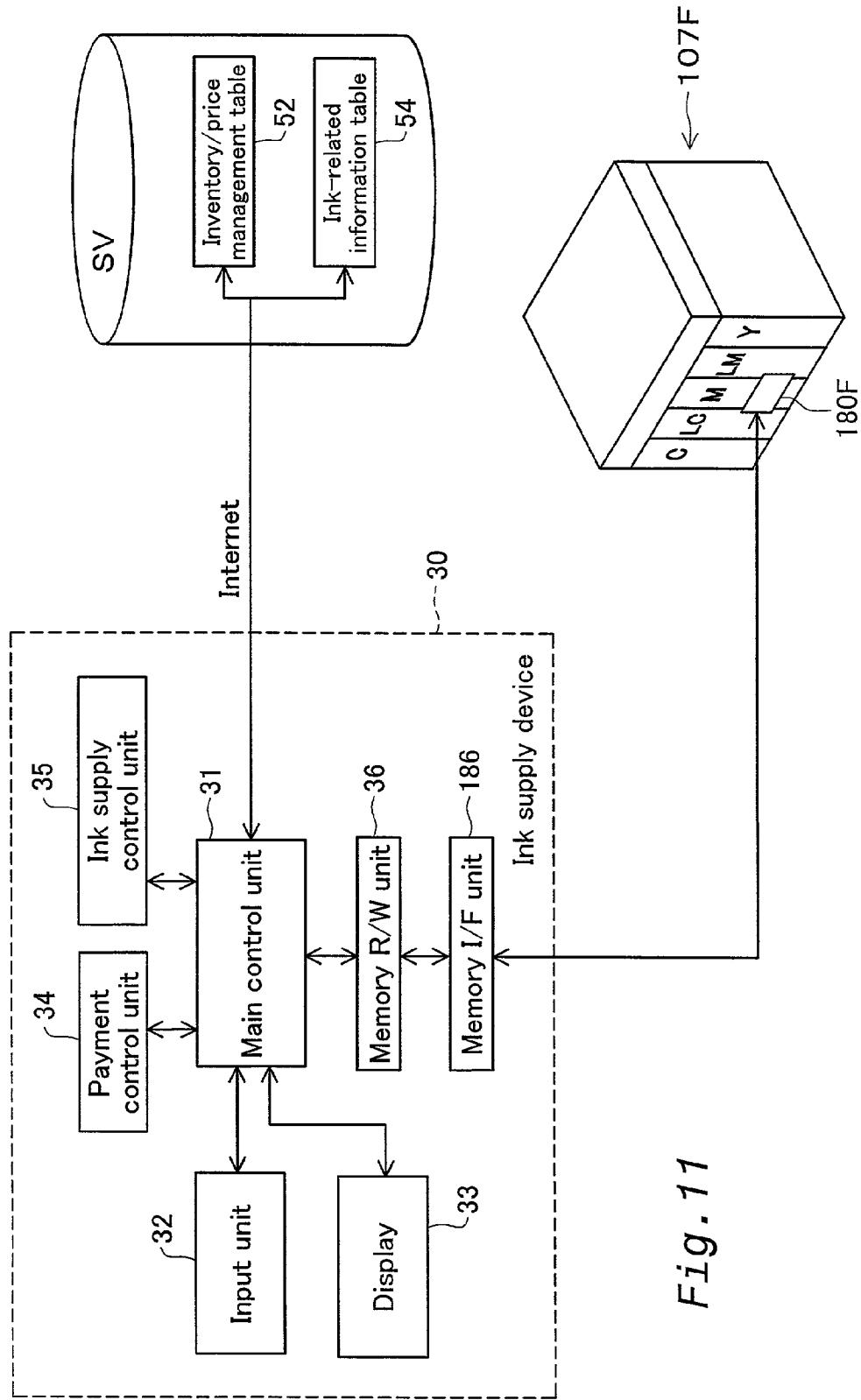
FIG. 11 is a block diagram of an exemplary electrical arrangement for ink supply device 30.

FIG. 11 is a block diagram of an exemplary electrical arrangement for ink supply device 30. Ink supply device 30 comprises a main control unit 31; an Input unit 32 serving as the user interface; a display 33; a payment control unit 34 for calculating ink price and controlling receipt of payment; an ink supply control unit 35 for controlling ink fill-ups/refills/substitutions, or new ink cartridge supply; a memory interface unit 186; and a memory readout unit 36. Here, ink fill-up refers to a process of injecting the same kind of ink without expelling residual ink in the ink cartridge; ink refill refers to a process of injecting the same kind of ink after first expelling ink remaining in the ink cartridge; and ink substitution refers to a process of injecting a different kind of ink after first expelling residual ink in the ink cartridge. New ink cartridge supply refers to supply of a new ink cartridge in exchange for an ink cartridge possessed by the user.

Main control unit 31 is connected to server system SV via the Internet. Server system SV controls and supports ink supply by ink supply device 30. Specifically, to server system SV uses data from an inventory/price management table 52 to perform ink inventory control in ink supply device 30 and set ink supply prices, for example. The server system SV also provides user support for supplied ink. For example, in the event that a newly marketed ink is available, an ink-related information table 54 is used to provide information needed to use the ink. This information will include, for example, version information for the firmware 22 required for use of the ink.

Input unit 32 transmits user input to ink supply device 30 to main control unit 31. Display 33 displays the amount of remaining ink in the ink cartridge, user input, and other information, providing support for user input. In the embodiments herein, Input unit 32 is a touch panel on display 33.

Memory readout unit 36 is connected, via memory interface unit 186, to a memory 180F provided to color ink cartridge 107F. Memory readout unit 36 reads out the amount of remaining ink and other information stored in memory 180F, and writes information instructed to be written by main control unit 31.

Figure 12:
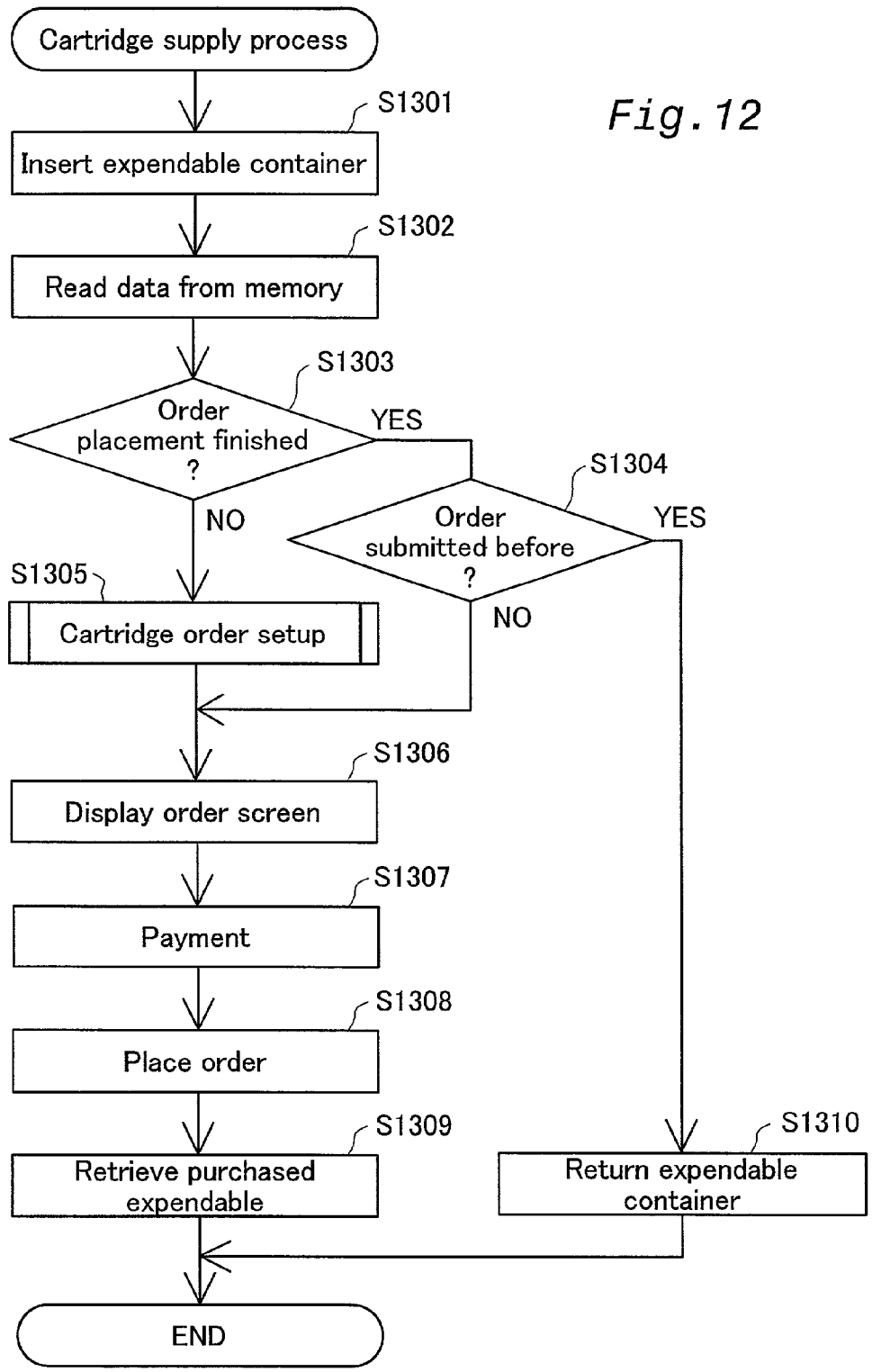
FIG. 12 is a flow chart depicting the steps in an ink supply process according to a second embodiment of the invention.

FIG. 12 is a flow chart depicting the steps in an ink supply process according to a second embodiment of the invention. In Step S1301, an ink cartridge is mounted in a cartridge mounting unit (described later) located to the inside of cartridge insertion slot 39 (FIG. 10). Ink supply device 30 houses cartridge mounting units of various types, selectable depending on cartridge configuration. Selection may be made, for example, by entering the ink cartridge model number to the ink supply device 30, or selecting the ink cartridge model number shown on the display 33, which functions as a touch panel.

Figure 13A:
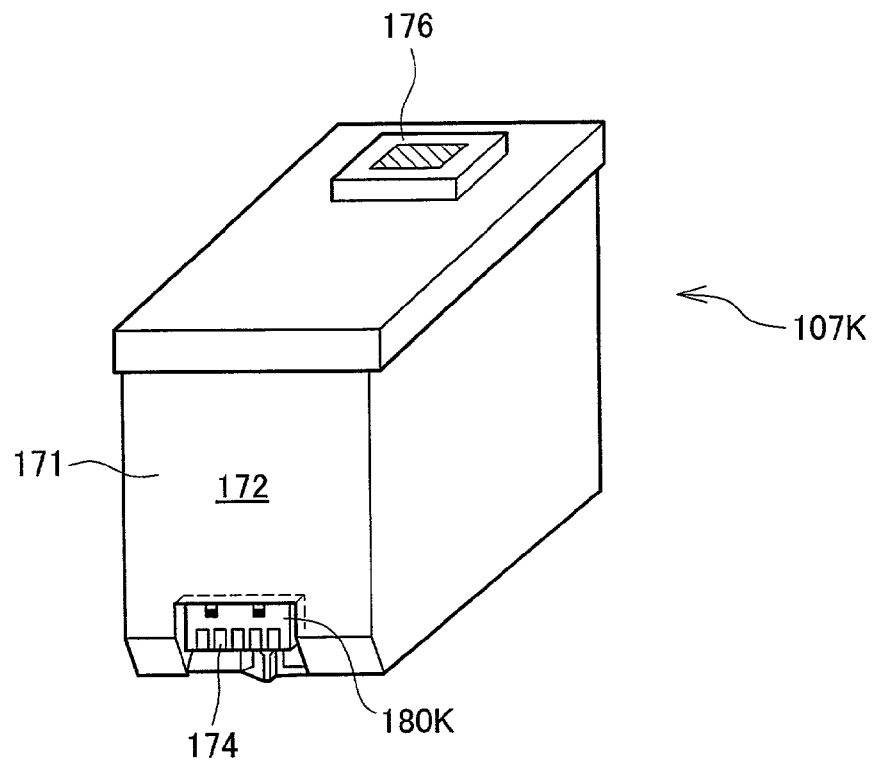
FIGS. 13A and 13B are perspective views showing a simplified structure for ink cartridge 107K and the floor of cartridge mounting unit 18, respectively.
Figure 13B:
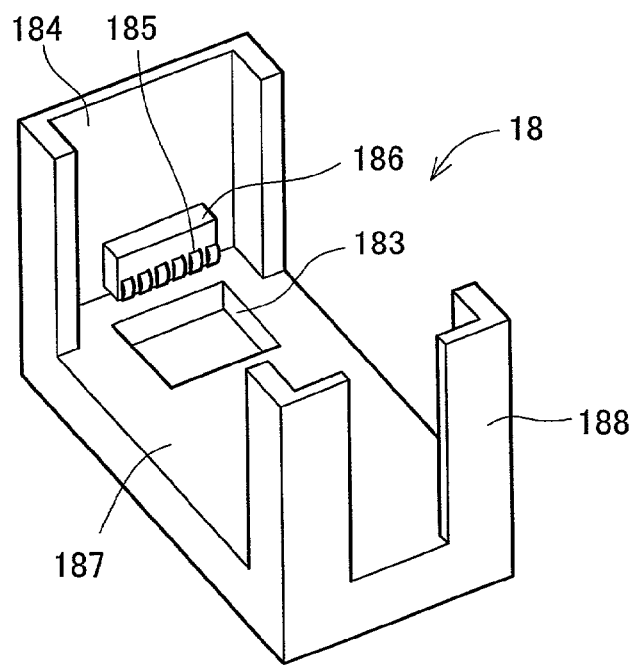
Figure 14:
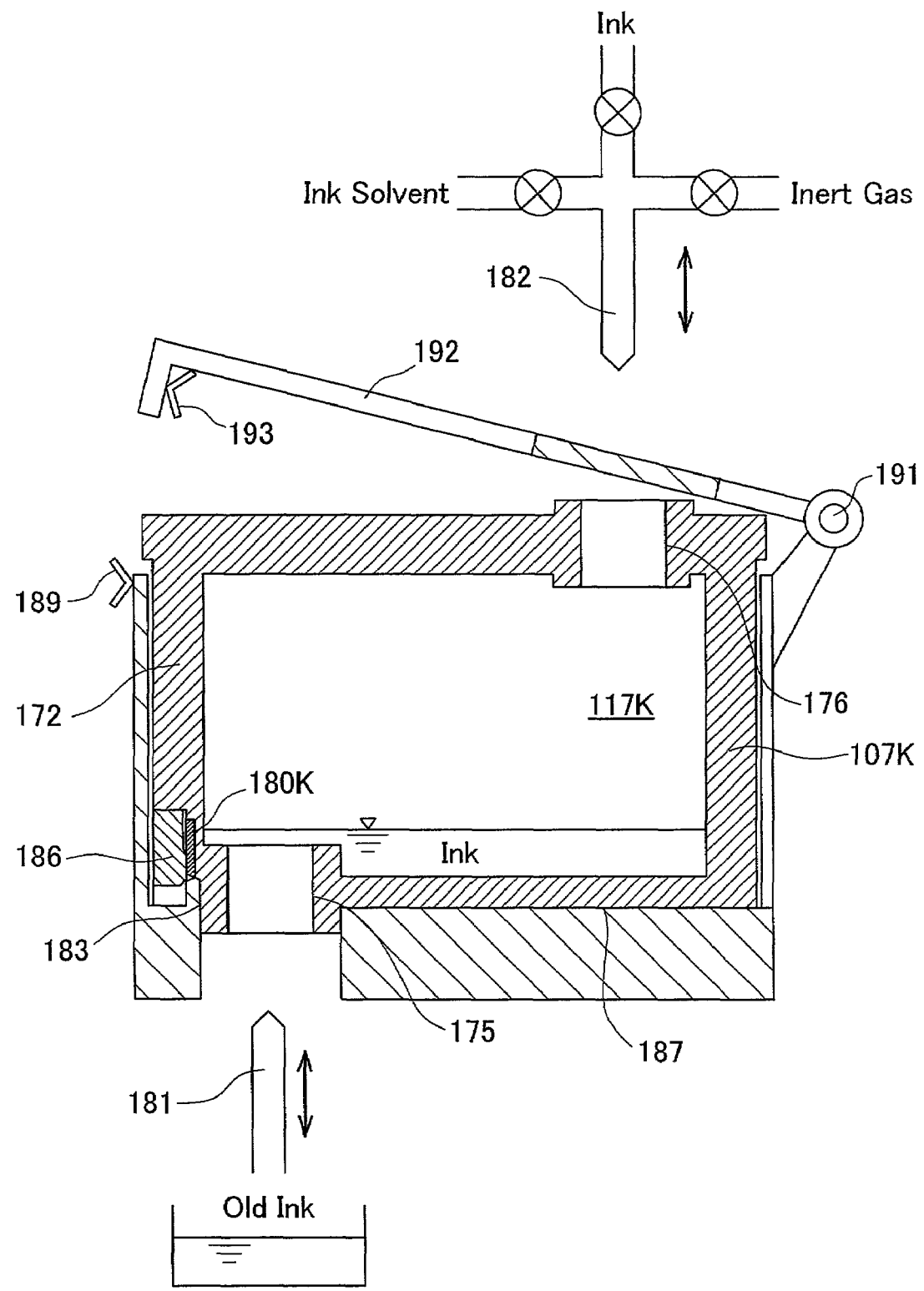
FIG. 14 is a sectional view of ink cartridge 107K and cartridge mounting unit 18.

FIGS. 13A and 13B are perspective views showing a simplified structure for ink cartridge 107K and the floor of cartridge mounting unit 18. FIG. 14 is a sectional view of ink cartridge 107K and cartridge mounting unit 18. To facilitate description, FIGS. 13A and 13B and FIG. 14 depict an example in which ink cartridge 107K has only one ink tank.

Ink cartridge 107K comprises a cartridge body 171 (FIG. 13A) having an ink tank 117K (FIG. 4); an ink supply orifice 176; an ink discharge orifice 175; and a memory 180K having a connector terminal 174. Memory 180K is rewritable nonvolatile memory whose contents can be erased electronically, such as EEPROM.

Cartridge mounting unit 18 comprises a rear wall portion 188 and inside wall 184 for securing ink cartridge 107K in the horizontal direction; a connector 186; a recess 183 for mating with the ink discharge orifice 175 of ink cartridge 107K; a floor 187 for positioning ink cartridge 107K in the vertical direction; and a locking lever 192 (FIG. 14) for locking in place ink cartridge 107K in the vertical direction. Connector 186 comprises a connector terminal 185 for electrical connection of memory 180K with connector terminal 174. Connector 186 is also referred to as the memory interface.

Mounting of ink cartridge 107K in cartridge mounting unit 18 is performed as follows. First, the user enters into ink supply device 30 information indicating the model number of the ink cartridge, whereupon the cartridge mounting unit 18 for mounting this particular ink cartridge appears in the cartridge insertion slot 39 (FIG. 10). As shown in FIG. 14, the rear wall portion 188 of cartridge mounting unit 18 has attached thereto a locking lever 192 that turns about a support post 191; when this locking lever 192 is pulled upward, ink cartridge 107K can be placed in cartridge mounting unit 18. The use then places ink cartridge 107K within cartridge mounting unit 18 so that the memory 180K of ink cartridge 107K connects to connector 186 of cartridge mounting unit 18, and lowers the locking lever 192 to cover ink cartridge 107K, completing the installation.

When installation is complete and electrical connection has been established between the connector terminal 185 of connector 186 and the connector terminal 174 of memory 180K, memory 180K detects memory readout unit 36 and proceeds to Step S1302.

In Step S1302 memory readout unit 36 reads out from memory 180F data for use in ink supply. This data includes cartridge order settings, and order status information indicating whether an order has been made on-line with a discount obtained on the presumption that the cartridge will be returned.

In Step S1303, ink supply control unit 35 verifies whether a cartridge order has been placed. If no cartridge order has been placed for the cartridge return, the system proceeds to Step S1305 wherein a cartridge order is placed to ink supply device 30. This is done according to the process shown in the flow chart in FIG. 4. Main control unit 31 displays on display 33 the menus depicted in FIGS. 8-9. In the second embodiment, payment control unit 34 performs the payment determining function performed by price determiner 55. Once order placement is complete the system proceeds to Step S1306. If a cartridge order has been placed, on the other hand, it proceeds to Step S1304.

In Step S1304 a determination is made as the whether an order has been submitted previously on the assumption that the cartridge currently placed in ink supply device 30 would be returned. This determination is made by ink supply control unit 35 on the basis of the order status information stored in memory 180F. If such an order has been submitted previously, the user's cartridge is returned to the user. If the process of supply by an on-line sale has not yet been initiated, the ink supply device 30 may cancel the sale so that a new ink cartridge may be received from the ink supply device 30. In preferred practice, user consent will be obtained.

Where a cartridge order has been placed but not submitted, memory readout unit 36 will, instead of the process of Step S1305, read out the content of the cartridge order from the cartridge memory 180F. This content will have been created previously on computer 90. After reading out the information the system proceeds to Step S1306.

An Internet connection to server system SV is not necessarily required to make settings on computer 90; it is sufficient for settings to be made such as to identify a particular ink cartridge for purchase.

In Step S1306 the main control unit 31 displays an order menu (not shown) on display 33. This menu is used to verify the contents of a cartridge order, and includes display of the price for ink supply.

In Step S1307, the user makes payment. Payment is made by inserting the required payment in the payment portion 37. In Step S1308, the user confirms order content and submits the order. In Step S1309, in response to the order, the ink supply device 30 dispenses a new ink cartridge from the cartridge insertion slot 39, and this is retrieved by the user. Alternatively, a new ink cartridge coupon could be dispensed in place of an actual new ink cartridge.

As described hereinabove, the process illustrated in FIG. 12, like the first embodiment, promotes reuse of ink cartridges.

In this second embodiment, Input unit 32, memory interface unit 186, and memory readout unit 36 function as inquiry receiver enabling user input of inquiries to ink supply device 30.

C. Third Embodiment

In a third embodiment of the invention, in contrast to the first and second embodiments, ink is supplied to an ink cartridge possessed by the user. This ink supply system, like that of the second embodiment, comprises a server system SV for managing ink supply, an ink supply device 30, and a printing device 21 that uses the supplied ink.

Figure 15:
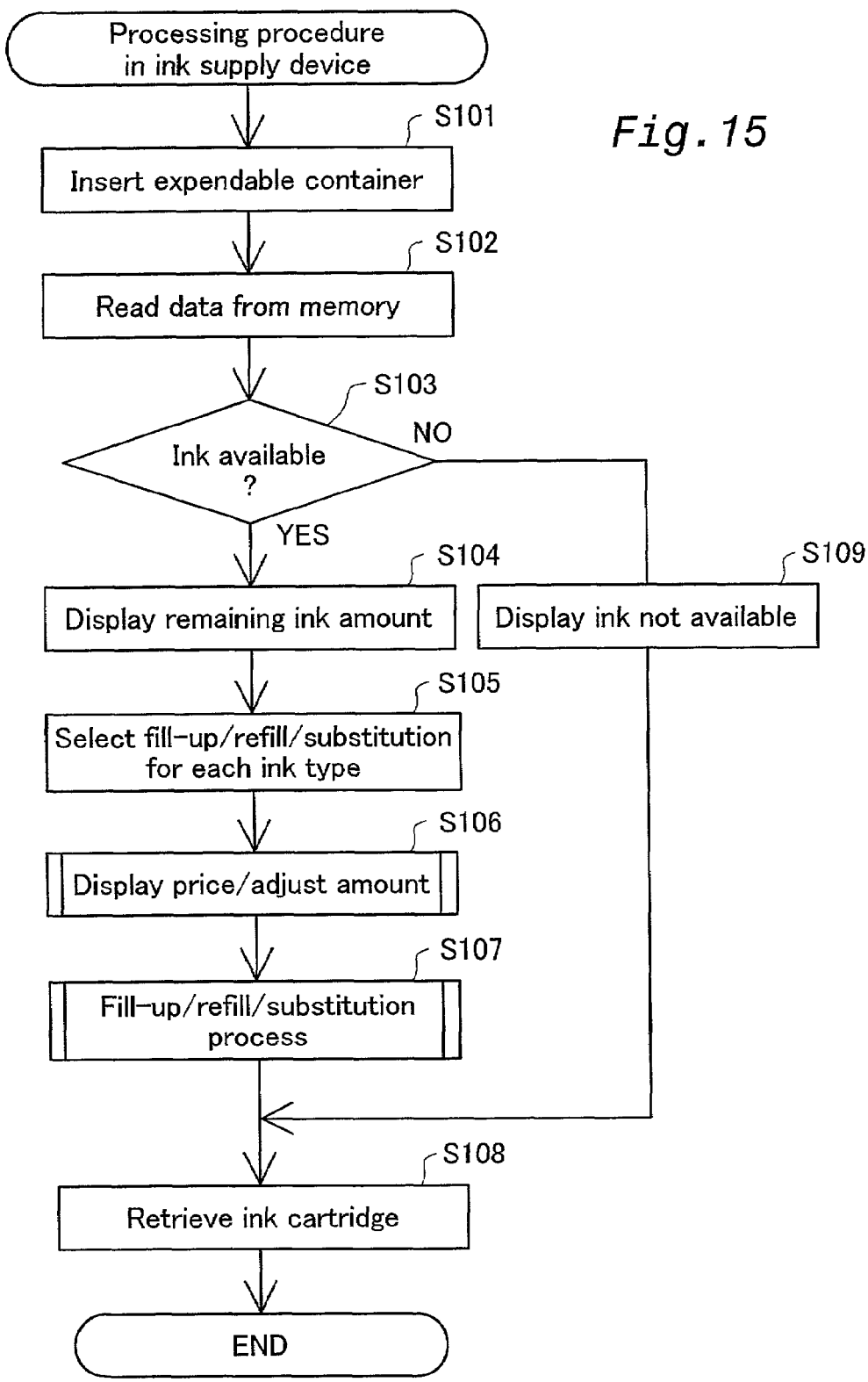
FIG. 15 is a flow chart depicting the steps in an ink supply process according to a first embodiment of the invention.

FIG. 15 is a flow chart depicting the steps in an ink supply process according to a first embodiment of the invention. In Step S101, as in the second embodiment, an ink cartridge is placed in a cartridge mounting unit 18 (FIG. 13B) situated within a cartridge insertion slot 39 (FIG. 10).

When installation is complete and electrical connection has been established between the connector terminal 185 of connector 186 and the connector terminal 174 of memory 180K, memory 180K detects memory readout unit 36 and proceeds to Step S102. The following description of Step S102 and subsequent steps takes the example of supply of ink to the color ink cartridge 107F depicted in FIG. 11.

In Step S102 memory readout unit 36 reads out from memory 180F data for use in ink supply. This data includes data 210 relating to manufacture of ink cartridge 107F; data 220 relating to ink use; data 310 relating to number of ink fill-ups/refills/substitutions; and ink-related data 320.

Data 210 (FIG. 5) relating to manufacture of ink cartridge 107F includes the following data for ink cartridge 107F: model data; manufacturing date data; production line data; serial number data; and data indicating the capacity of each ink tank 117F (not shown) in ink cartridge 107F. In the present embodiment, this data is used to determine whether ink can be injected into this ink cartridge 107F.

Data 220 (FIG. 5) relating to ink cartridge service includes data indicating the remaining amount of each ink in the cartridge; cartridge unsealing date data; and an order flag. Data indicating the remaining amount of each ink in the cartridge, together with data for the capacity of each ink tank 117, described earlier, is used to calculate an amount of ink that can be injected. The amount of ink that can be injected is used to inject the proper amount of ink by means of ink supply device 30.

Data 310 (FIG. 6) relating to the number of ink fill-ups/refills/substitutions (FIG. 6) includes data indicating how many times ink has been replenished in the past, etc., and data indicating how many replenishments are possible, etc. This data limits the number of ink replenishments, etc. to within a predetermined range, thereby preventing difficulties as well as assuring good print quality.

Ink-related data 320 (FIG. 6) includes information about the types of ink contained in each ink tank 117F, and the ink expiration date for these. Information relating to ink types is primarily used to identify types of ink for injection when filling up or refilling inks. The ink expiration date allows the user to determine whether ink should be filled up, or instead refilled.

In the present example, service environment information 330 (FIG. 6) for the ink cartridge of printing device 21 includes a printer ID indicating the model of the printer 20 in which ink cartridge 107F was last used; information about the operating system of the computer 90 connected to printer 20; printer driver information indicating printer driver 12 (FIG. 10) type and version; and firmware information indicating firmware 22 (FIG. 10) type and version. This information is used to determine whether different types of ink can be used.

In Step S103, it is determined whether ink can be supplied by ink supply device 30. This determination is made, for example, by main control unit 31 by ascertaining whether the number of ink fill-ups/refills/substitutions to date is below a certain limit. If, as a result, it is determined that ink cannot be supplied, the system proceeds to Step S108, and a message indicating that ink cannot be supplied is displayed on the display 33. If, on the other hand, it is determined that ink can be supplied, the system proceeds to Step S104. In the event that supply is not possible for only a few certain ink cartridges, a message to this effect is displayed, and the system proceeds to Step S104.

Figure 16:
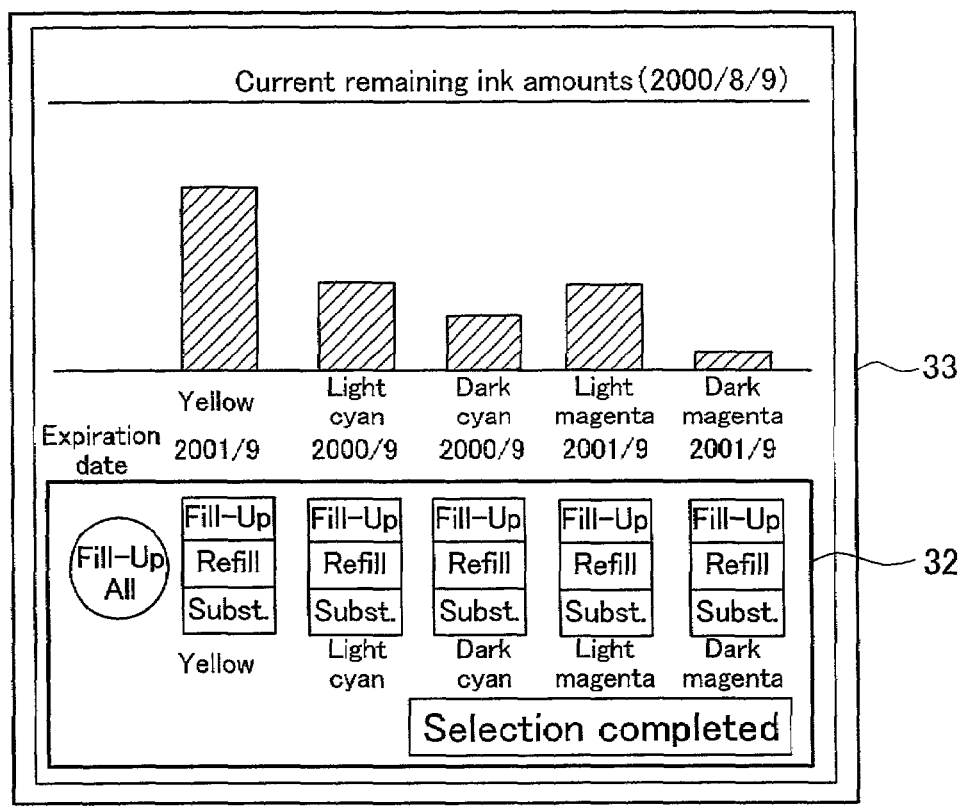
FIG. 16 is an illustrative diagram showing the amount of remaining ink being displayed on display 33.

In Step S104, main control unit 31 displays on display 33 remaining ink amounts for each ink tank 117F. FIG. 16 is an illustrative diagram showing the amount of remaining ink being displayed on display 33. With reference to remaining ink amounts the user decides whether to receive ink supply. The decision may be a decision to fill up or refill the ink; or a decision as to ink fill-up amounts.

In Step S105, the user selects whether to fill-up, refill, or substitute the ink in each ink tank 117F. This selection is made by the user in consideration of current ink remaining amount status, described earlier. In the example depicted in FIG. 16, it would be preferable to select Fill-up for the light magenta and dark magenta (as there is about a year remaining before these expire) and to select Refill for the light cyan and dark cyan (as these are close to expiration). If the user desired to fill up all inks, "Fill-up All" is selected. After completing selection, the "Selection Completed" display on Input unit 32 is touched. This inputs the selections to main control unit 31, and the system proceeds to Step S106.

If an ink upgrade is selected, there is an additional step prior to Step S106. In this step, a determination is made as to whether proper printing can be achieved using the upgraded ink in the ink cartridge service environment of the printing device 21 in which the ink cartridge 107F was last used. This determination is made, for example, on the basis of information indicting the type and format of the software —such as a printer driver 12 or firmware 22 that generates data for controlling expulsion of ink. This is because in some instances certain ink types may not be compatible with certain ink cartridge service environments. For example, it is conceivable that a newly marketed ink may not provide a correctly matched color combination unless a new version of printer driver 12 is used, resulting in an inability to print optimally.

As a result of this determination, if upgrading to the ink is question is not possible, a message to this effect is displayed, and the Fill-up and Refill selections are again shown on display 33. Where compatibility is possible by modifying the ink cartridge service environment by means of a version upgrade or other method, a message to this effect is shown on display 33, and a query for selecting the Fill-up or Refill options is displayed. The determination as to whether compatibility is possible is made on the basis of information indicating the printer model. Where, for example, the printer is of a type having firmware 22 installed in rewritable, nonvolatile memory, and the capacity of the nonvolatile memory is sufficient to accommodate the updated version of the firmware 22, compatibility is determined to be possible.

Figure 17:
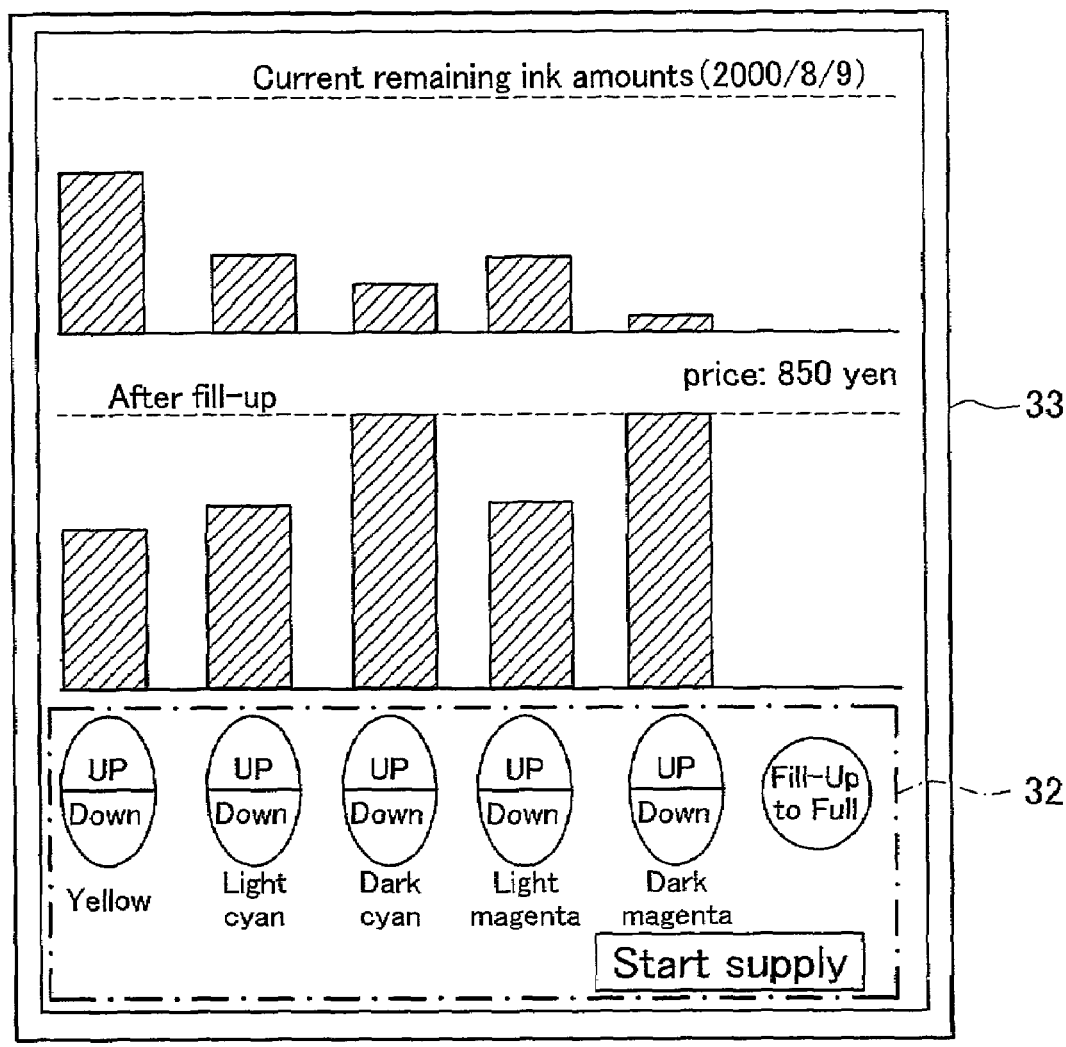
FIG. 17 is a diagram showing the display of an ink supply device according to an embodiment of the invention.

FIG. 17 is a diagram showing a menu view of display 33 in Step S106. In the example depicted in FIG. 17, "Fill-up" has been selected for all ink tanks 117F in Step S105. At the top of display 33 there is indicated the current remaining ink amounts, and remaining ink amounts after fill-up. "UP/DOWN" displays 13 which appear below bars indicating remaining amounts—function as an Input unit 32 allowing remaining ink amounts after fill-up to be set.

In Step S106, ink amounts subsequent to filling up/refilling/substitution can be set as follows. When the user touches the "UP" portion for light cyan, the light cyan bar graph extends upward and price increases. In this way, the user can set desired ink amounts subsequent to filling up/refilling/substitution, while at the same time verifying price. Touching a "Fill-up All" display fills up all the tanks of the ink cartridge. Once settings have been made, the "Start Supply" display of Input unit 32 is touched, whereupon the settings are input to main control unit 31.

Figure 18:
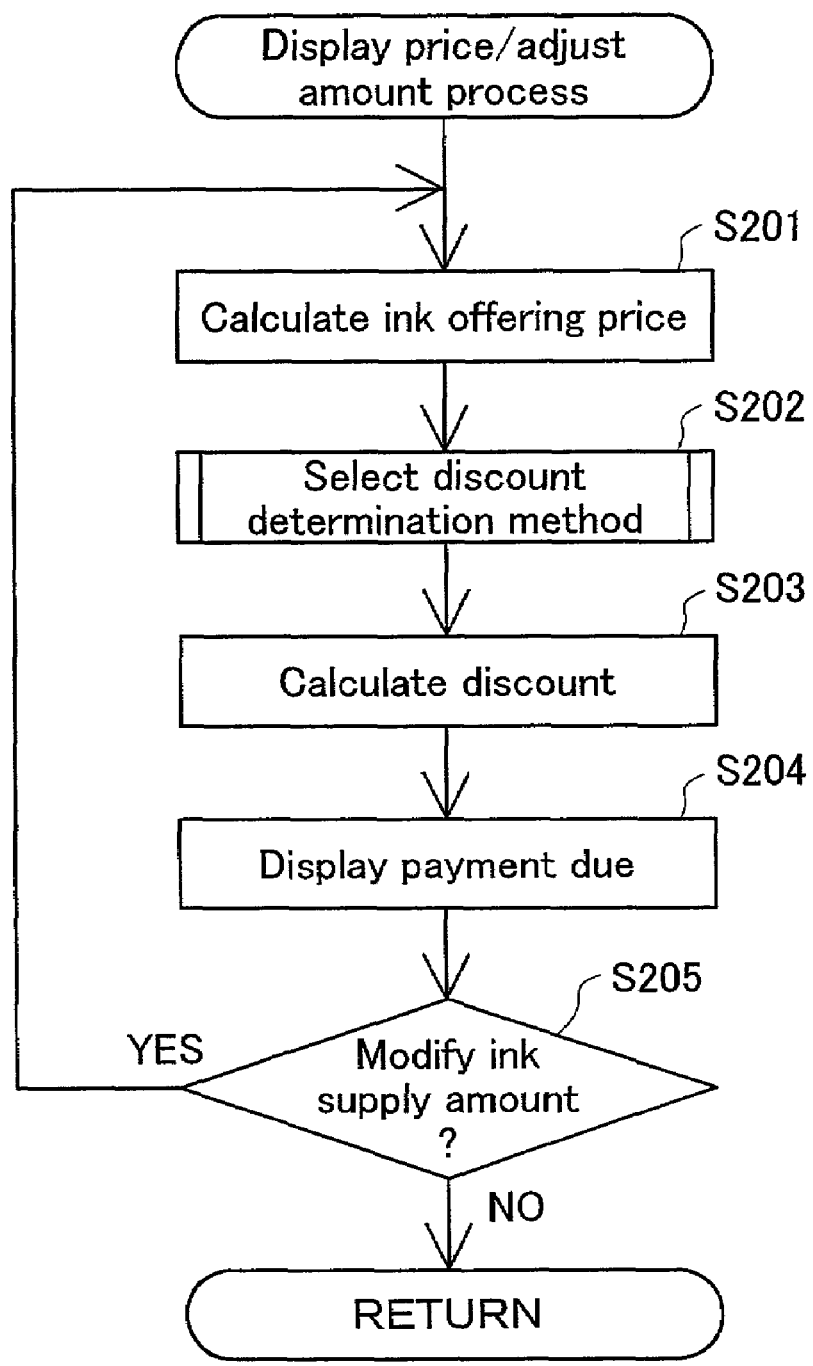
FIG. 18 is a flow chart depicting the process for price display and ink quantity adjustment.

FIG. 18 is a flow chart depicting in detail the process of Step S106, and shows the process for price display and for adjusting ink quantities. In Step S201, payment control unit 34 calculates ink supply price based on settings information input from Input unit 32. This calculation is performed as follows, based on the ink supply method (filling up, refilling or substitution).

(1) If the ink fill-up option is selected, the amount of ink to be injected additionally is multiplied by the ink unit price for each ink tank 117F, and the sum of these is determined to be the ink supply price. Ink unit cost is equal to the unit cost of the ink remaining in ink tank 117F.

(2) If the ink replace or upgrade option operation is selected, an ink cartridge cleaning charge and the product of amount of ink to be injected after the ink cartridge is cleaned and the unit price of the supplied ink are calculated for ink tank 117F, and the sum of these is determined to be the ink supply price. Ink unit cost, in the case of replacement, is equal to the unit cost of the ink remaining in ink tank 117F, and in case of an upgrade is equal to the unit cost of the ink selected by the user.

Once ink supply price has been determined, the system proceeds to Step S202, in which the discount determination method is selected.

Figure 19:
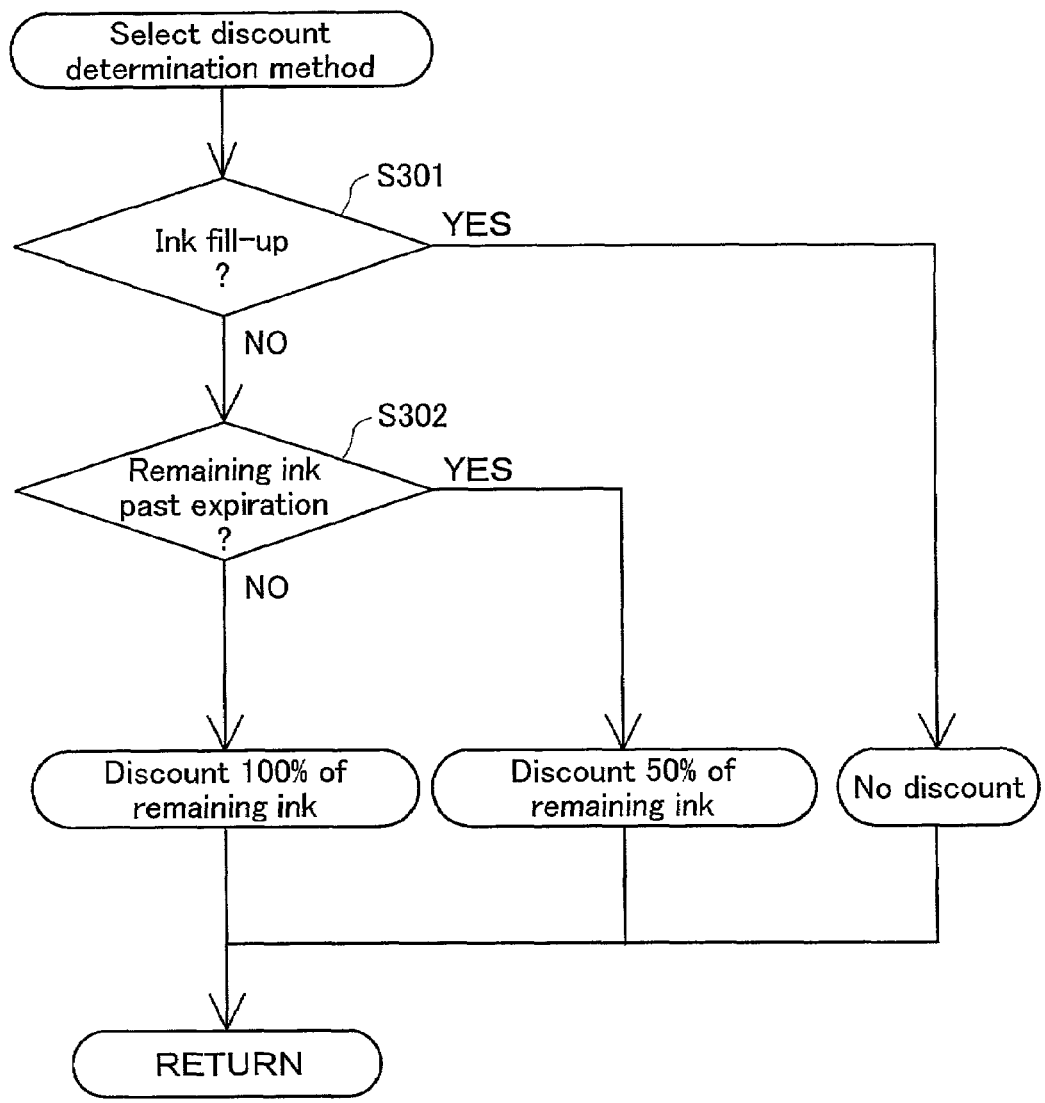
FIG. 19 is a flow chart depicting a selection process in a method for determining a discount.

FIG. 19 is a flow chart depicting a selection process in a method for determining a discount. In Step S301, payment control unit 34 determines, for each ink tank 117F, whether Fill-up has been selected as the ink supply method. As a result of this determination, if the selected ink supply method is an ink fill-up, payment control unit 34 determines that there is no discount. If, on the other hand, the selected ink supply method is an ink refill or ink substitution, the system proceeds to Step S302.

In Step S302 the payment control unit 34 determines whether any ink remaining in ink tanks 117F is past the expiration date. As a result of this determination, payment control unit 34 makes the following determinations for each ink tank 117F, based on whether the expiration date has passed, in a manner analogous to the first embodiment.

(1) If the expiration date has not passed, the discount is equal to 50% of the product of the amount of remaining ink in ink tank 117F and the price of the remaining ink.

(2) If the expiration date has passed, the discount is equal to 100% of the product of the amount of remaining ink in ink tank 117F and the price of the remaining ink.

It is sufficient for the discount to be computed on the basis of the amount of remaining ink in ink tank 117F: the decision may be made irrespective of expiration date. Discount rates are not limited to 50% and 100%, and may be selected arbitrarily.

In Step S203 the payment control unit 34 calculates the discount according to the selected method for determining the discount. A specific calculation would be performed, for example, as follows: where the ink remaining in an ink tank 117F has not expired, ink price is 100 yen per 1 cc, and the remaining amount is 1.5 cc, the discount is 100 yen×1.5 cc×0.5=75 yen.

In Step S204, the total amount due is calculated and displayed. The amount due is can be calculated by payment control unit 34 from the ink supply price calculated in Step S201 and the discount calculated in Step S203. The total amount due so calculated is displayed on display 33 by main control unit 31. The processes of Steps S201-S204 are repeated by main control unit 31 until the "Start Supply" display is touched to commence supply. In preferred practice, this repetition (updating) will be performed sufficiently frequently, for example, at an update rate of each 0.1 second. Where sufficiently fast, the user can verify the amount due in real time, while setting ink supply amounts. When the "Start Supply" display is touched the system proceeds to Step S107.

Figure 20A:
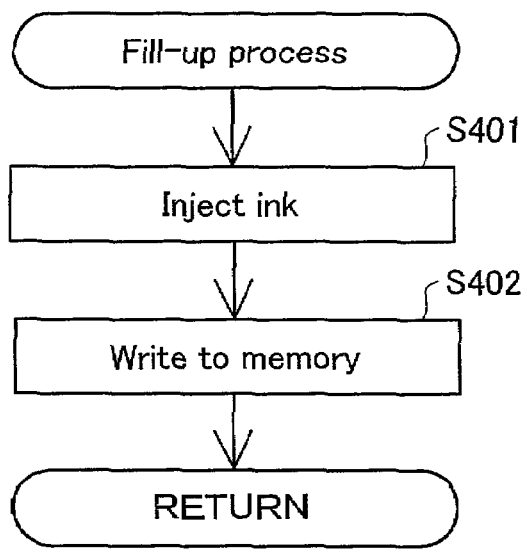
FIGS. 20A and 20B are flow charts depicting an ink fill-up/refill/substitution process in an embodiment of the invention.
Figure 20B:
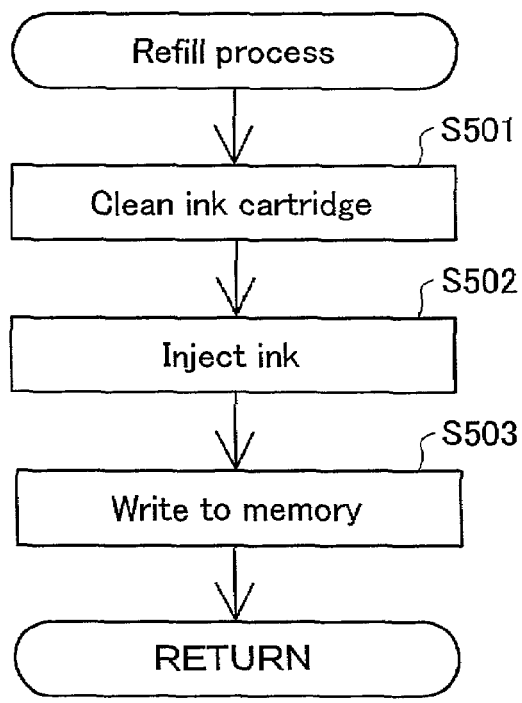

FIGS. 20A and 20B are flow charts depicting in detail the process in Step S107. Since procedures for ink fill-ups, refills and substitutions differ, these will be treated separately in the following discussion.

Ink fill-ups are performed according to the flow chart shown in FIG. 20A. As noted, ink fill-up refers herein to a process of injecting the same kind of ink without first expelling ink remaining in the ink cartridge.

In Step S401, ink injection is performed. Injection is initiated by lowering an injector needle 182 (FIG. 14) to insert it into ink supply orifice 176, and raising ink discharge needle 181 (FIG. 14) to insert it into ink discharge orifice 175. Discharge needle 181 is inserted deeply into ink tank 117K (FIG. 14) so that the distal end thereof comes into close proximity with the top end of the tank. Next, ink of the same kind remaining in the ink cartridge is injected, in the preset amount, from injector needle 182. Air present within ink tank 117K is evacuated through discharge needle 181. IN this way ink is injected into the ink cartridge.

During this process, in consideration of the fact that solvent in the ink may have evaporated since the ink cartridge was unsealed, ink solvent may be injected through injector needle 182 prior to injecting the ink. The amount of ink solvent may be determination from the ink cartridge 107F unsealing date, for example.

In Step S402, information relating to ink supply is written to memory 180F. This information includes remaining ink amounts after fill-up, and updated number of fill-ups/refills/substitutions. When done writing to memory 180F, injector needle 182 and discharge needle 181 are withdrawn, allowing color ink cartridge 107F to be removed. When a message to this effect is displayed on display 33, the user can retrieve the color ink cartridge 107F.

Ink refills are performed according to the flow chart shown in FIG. 20B. As noted, ink refill refers herein to a process of injecting the same kind of ink after first expelling ink remaining in the ink cartridge.

In Step S501, the ink cartridge is cleaned. Cleaning is accomplished by lowering injector needle 182 (FIG. 14) to insert it into ink supply orifice 176, and raising ink discharge needle 181 (FIG. 14) to insert it into ink discharge orifice 175. Discharge needle 181 is inserted slightly into ink tank 117K (FIG. 14) so that the distal end thereof comes into close proximity with the bottom end of the tank. Next, an inert gas such as nitrogen is injected through injector needle 182 to eject any remaining ink through discharge needle 181. In preferred practice, suction will be applied to discharge needle 181. This enables ink discharge to be completed rapidly. Next, an ink solvent is injected through injector needle 182 and discharged through discharge needle 181 to rinse out any remaining ink and clean in the interior of ink tank 117K.

In Step S502 ink is injected. Ink injection is initiated by first inserted discharge needle 181 more deeply into ink tank 117K (FIG. 14) so that the distal end thereof comes into close proximity with the top end of the tank. Ink is then injected by a process similar to the process described in Step S401.

In Step S503 information relating to ink supply is written to memory 180F. As with the ink fill-up process, this information includes remaining ink amounts after fill-up, and updated number of fill-ups/refills/substitutions, but in contrast thereto, the ink expiration date is updated as well. Subsequent processes are the same as with ink fill-up.

The ink substitution process follows the same procedure as the ink refill process, but differs there from in that substituted ink type is stored in memory. As noted, ink substitution refers to a process of injecting a different kind of ink after first expelling ink remaining in the ink cartridge.

According to the process steps shown in FIG. 15 and described hereinabove, a price discount is awarded for ink that has not been consumed, thereby promoting reuse of ink cartridges. Since discounts are awarded for remaining ink, discarding of ink is discouraged, which contributes to protection of the environment.

In this first embodiment, Input unit 32, memory interface unit 186 and memory readout unit 36 function as an inquiry receiver for input of user inquiries to ink supply device 30.

D. Modifications

While the invention has been described with reference to certain preferred embodiments, it is not limited to the embodiments set forth hereinabove. A wide variety of modifications thereto, such as the following, may be effected without departing from the spirit and scope of the invention.

D-1 In the preceding embodiments the invention is reduced to practice in an ink cartridge for use in an ink-jet printer, but could be implemented in a toner cartridge, or in a printer wherein the ink cartridge and print head are integral. The invention is not limited to practice in printer expendables, and is applicable to all manner of commercially distributed expendables of gaseous, liquid or solid form housed in expendable containers.

D-2 In the preceding first embodiment, both ink supply (ink injection) settings and actual ink injection are performed by the ink supply device 30, but ink settings could be made over the Internet.

For example, a procedure similar to the procedure depicted in FIG. 15 could be performed from the browser 10 on the computer 90, and the results placed in memory 180F. In this case settings will be made directly using the server system's SV inventory/price management table 52 and ink-related information table 54. By placing a color ink cartridge 107F equipped with memory 180F in ink supply device 30, ink supply can be performed on an automated basis. This allows settings to be made at home, so that the ink supply device 30 may be used smoothly.

D-3 In the preceding first embodiment, an order flag stored in the memory provided to the ink cartridge is referred to by the server to allow it to determine order status, i.e., whether there has previously been issued a cartridge order on the presumption that this cartridge will be returned; however, management of order status on the server end could be accomplished on the basis of other information (such as serial number) identifying the ink cartridge.

Although the present invention has been described and illustrated in detail, it is clearly understood that the same is by way of illustration and example only and is not to be taken by way of limitation, the spirit and scope of the present invention being limited only by the terms of the append claims.

What is claimed is:

1. A method for supplying a new expendable by a computer, the new expendable being packaged in a new expendable container, the method comprising the steps of:
    (a) accepting an inquiry regarding supply of the new expendable, the inquiry including expendable-related information indicative of a model of an expendable container possessed by a user;
    (b) determining a first type price at which the new expendable is to be supplied on condition that the expendable container possessed by the user is returned in response to the inquiry;
    (c) displaying the first type price to the user;
    (d) accepting a first type order from the user, the first type order generating a charge amount at the first type price on condition that the expendable container possessed by the user is returned; and
    (e) supplying the new expendable in exchange for the expendable container possessed by the user in response to the first type order;
    wherein the expendable-related information further includes information indicative of a remaining amount of expendable remaining in the expendable container and unsealing date information indicative of an unsealing date of the expendable; and
    the step (c) further includes the steps of:
        selecting at least one new expendable from a plurality of types of expendables of different volume based on the remaining amount information; and
        displaying the selected new expendable as a recommended expendable.

2. The method in accordance with claim 1 wherein
    the expendable container comprises a memory for storing the expendable-related information, and
    the expendable-related information is to be read out from the memory.

3. The method in accordance with claim 1 wherein the step (b) includes the steps of:
    verifying whether the first type order has been submitted to the supplier for the expendable container before; and
    determining the first type price if the first type order has not been submitted before, while determining a second type price if the first type order has been submitted before, the second type price at which the new expendable is to be supplied on condition that the expendable container possessed by the user is NOT returned;
    the step (d) includes a step of accepting the first type order if the first price has been determined, while accepting the second type order if the second price has been determined, the second type order generating a charge amount at the second type price in response to the price determination; and
    step (e) includes a step of supplying the new expendable in response to the second order.

4. The method in accordance with claim 3 wherein
    the step (b) further includes a step of providing the user with options of the first type order and the second type order if the first type order has not been submitted before; and
    the step (d) further includes a step of accepting the first type order if the first price has been selected, while accepting the second type order if the second price has been selected, in response to a selection of the options.

5. The method in accordance with claim 1 wherein
    the step (c) further includes a step of displaying an expendable supply menu for supplying expendable if the remaining amount falls below a predetermined value.

6. A computer program product for causing a computer to accept an order for a new expendable, the new expendable being packaged in a new expendable container, the computer program product comprising:
    a computer readable medium; and
    a computer program stored on the computer readable medium, the computer program comprising:
        a first program for causing the computer to accept an inquiry regarding supply of the new expendable, the inquiry including expendable-related information indicative of a model of an expendable container possessed by a user;
        a second program for causing the computer to determine a price at which the new expendable is to be supplied on condition that the expendable container possessed by the user is returned in response to the inquiry;
        a third program for causing the computer to control a display of the price to the user; and
        a fourth program for causing the computer to accept the order from the user;
    wherein the order generates a charge amount on condition that the expendable container possessed by the user is returned,
    the expendable-related information further includes information indicative of a remaining amount of expendable remaining in the expendable container and unsealing date information indicative of a unsealing date of the expendable; and
    the third program further comprises:
        a program for causing the computer to select at least one new expendable from a plurality of types of expendables of different volume based on the remaining amount information; and
        a program for causing the computer to display the selected new expendable as a recommended expendable.

7. The computer program product in accordance with claim 6 wherein
    the third program further comprises a program for causing the computer to display an expendable supply menu for supplying expendable if the remaining amount falls below a predetermined value.

* * * * *